US012795533B2

(12) United States Patent
Goldberg et al.

(10) Patent No.: US 12,795,533 B2
(45) Date of Patent: Nov. 10, 2026

(54) EXTERNAL NETWORK CONNECTIVITY BASED ON ACCESS POINT HANDOVER THROUGH MESH NETWORK

(71) Applicant: SONY GROUP CORPORATION, Tokyo (JP)

(72) Inventors: Adam Goldberg, San Diego, CA (US); Luke Fay, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 308 days.

(21) Appl. No.: 18/596,557

(22) Filed: Mar. 5, 2024

(65) Prior Publication Data

US 2025/0287299 A1 Sep. 11, 2025

(51) Int. Cl.
*H04W 48/20* (2009.01)
*H04W 36/30* (2009.01)
*H04W 84/18* (2009.01)

(52) U.S. Cl.
CPC ......... *H04W 48/20* (2013.01); *H04W 36/302* (2023.05); *H04W 84/18* (2013.01)

(58) Field of Classification Search
CPC ....... H04W 36/008357; H04W 36/302; H04W 48/20; H04W 84/12; H04W 36/035; H04W 84/18
See application file for complete search history.

(56) References Cited

U.S. PATENT DOCUMENTS 8,737,264 B2 5/2014 Denteneer et al.
12,463,767 B2 * 11/2025 Legg .................... H04L 5/0057
2009/0310488 A1 * 12/2009 Mighani ............... H04W 84/00 370/255
2014/0269610 A1 9/2014 Hiben
2015/0007288 A1 1/2015 Jing et al.
2015/0304983 A1 * 10/2015 Krening .............. H04W 64/003 370/254
2019/0313265 A1 10/2019 Yamamoto
2020/0287834 A1 * 9/2020 Ramanathan ........... H04L 69/16
(Continued)

FOREIGN PATENT DOCUMENTS

CN 112738907 A 4/2021
EP 3136698 B1 5/2018
(Continued)

*Primary Examiner* — Brian D Nguyen
(74) *Attorney, Agent, or Firm* — CHIP LAW GROUP

(57) ABSTRACT

An electronic device and a method is provided for external network connectivity based on access point handover through mesh network. A first access point associated with a first wireless network is detected within a first predefined radius. A first connection with the first wireless network is established, based on the first access point being within the first predefined radius. It is determined whether an external network is accessible, based on the established first connection. Detection of a second access point associated with a second wireless network within a second predefined radius from the first access point is controlled. It is determined whether the external network is accessible from the second access point, through the mesh network. The establishment of a second connection between the first access point and the second access point is controlled, based on the external network being accessible from the second access point, through the mesh network.

20 Claims, 8 Drawing Sheets

(56) References Cited

U.S. PATENT DOCUMENTS

| | | | | |
|---|---|---|---|---|
| 2023/0318167 | A1* | 10/2023 | Haynes | H01Q 1/2283<br>343/702 |
| 2024/0129834 | A1* | 4/2024 | Tassi | H04W 24/02 |
| 2024/0333445 | A1* | 10/2024 | Legg | H04B 7/0639 |
| 2025/0126520 | A1* | 4/2025 | Mohandass | H04W 76/10 |

FOREIGN PATENT DOCUMENTS

| | | | | |
|---|---|---|---|---|
| KR | 10-2008-0023465 | A | 3/2008 | |
| WO | WO-2011078646 | A1 * | 6/2011 | H04W 28/0883 |
| WO | WO-2023011917 | A1 * | 2/2023 | H04W 40/24 |

* cited by examiner

EXTERNAL NETWORK CONNECTIVITY BASED ON ACCESS POINT HANDOVER THROUGH MESH NETWORK

REFERENCE

None

FIELD

Various embodiments of the disclosure relate to external network connectivity. More specifically, various embodiments of the disclosure relate to an electronic device and a method for external network connectivity based on access point handover through mesh network.

BACKGROUND

Advancements in the field of information and communication technology (ICT) have led to development of electronic devices that may be capable of communicating with one another through wireless networks. An electronic device may use a communication channel to transmit media content to other devices. Quality of a communication channel used to transmit the media content by the electronic device may be based on a set of connectivity parameters associated with the communication channel. For example, the set of connectivity parameters may include, but is not limited to, a signal strength, a signal-to-noise (SNR) ratio, a bit error rate (BER), and a cross-channel interference.

To connect to external networks, an electronic device may connect to an access point, such as, a base station. The access point may establish a connection between the electronic device and the external networks. Typically, there may be various limitations in the connection between the electronic device and the external networks, via the access points. For example, a signal strength of the connection may reduce with distance of the electronic device and the access point. The weaker is the signal strength, the lower may be the quality of a communication channel that may be established between the electronic device and the external network. However, a reduction of the distance between the electronic device and the access point may improve the signal strength, but may reduce the mobility of the electronic device. In such a scenario, the electronic device may be moved within a limited region in a vicinity of the access point for better signals and connectivity.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for external network connectivity based on access point handover through mesh network is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
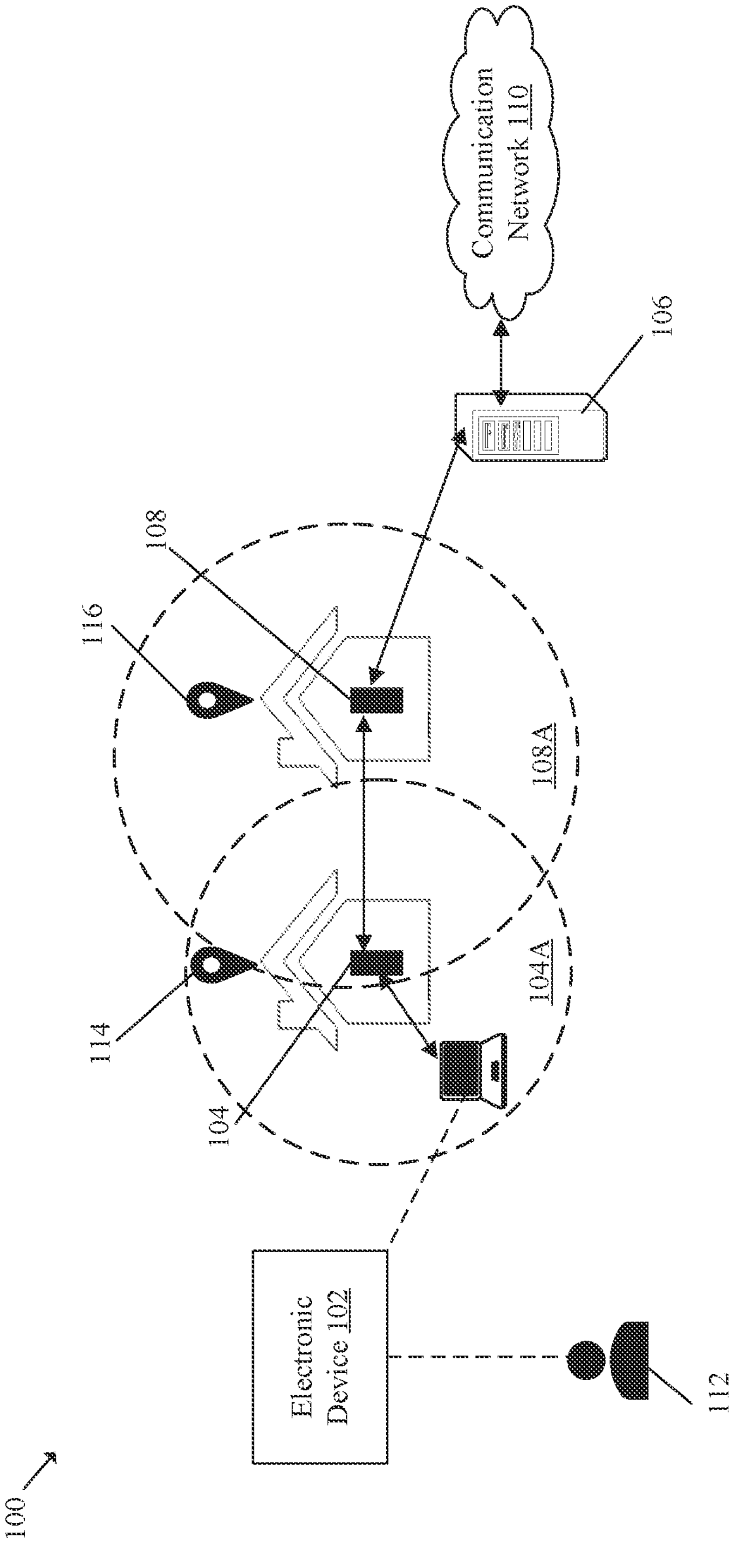
FIG. 1 is a block diagram that illustrates an exemplary network environment for external network connectivity based on access point handover through mesh network, in accordance with an embodiment of the disclosure.

The following described implementation may be found in an electronic device and method for external network connectivity based on access point handover through a mesh network. Exemplary aspects of the disclosure may provide an electronic device that may detect a first access point associated with a first wireless network within a first predefined radius. The electronic device may establish a first connection with the first wireless network, based on the first access point being within the first predefined radius. Further, the electronic device may determine whether an external network is accessible, based on the established first connection. The electronic device may control detection of a second access point associated with a second wireless network within a second predefined radius from the detected first access point. The control of the detection of the second access point may be based on the external network being inaccessible, and the first wireless network and the second wireless network may correspond to a mesh network of a set of interconnected access points. Furthermore, the electronic device may determine whether the external network is accessible from the second access point, through the mesh network. The electronic device may control establishment of a second connection between the first access point and the second access point, based on the external network being accessible from the second access point, through the mesh network, where the electronic device is connected to the external network through the established first connection and the control of the established second connection.

To connect to external networks, an electronic device may connect to an access point, such as, a base station. The access point may establish a connection between the electronic device and the external networks. Typically, there may be various limitations in the connection between the electronic device and the external networks, via the access points. For example, a signal strength of the connection may reduce with distance of the electronic device and the access point. The weaker is the signal strength, the lower may be the quality of a communication channel that may be established between the electronic device and the external network. However, a reduction of the distance between the electronic device and the access point may improve the signal strength, but may reduce the mobility of the electronic device. In such a scenario, the electronic device may be moved within a limited region in a vicinity of the access point for better signals and connectivity.

The electronic device of the present disclosure may provide connection with the external network through an access point handover in a mesh network including a set of interconnected access points. The electronic device may detect an access point within a certain radius from the electronic device. In case, an access point is identified within the particular radius from the electronic device, the electronic device may establish a connection with the access point through a wireless network associated with the particular access point. The electronic device may then determine whether an external network is accessible from the access point. In case, the external network is inaccessible directly from the access point, an accessibility to the external network from another access point within a certain radius of the initial access point may be determined. In case, the external network is determined to be accessible from the other access point (i.e., a one-hop access point), the initial access point and the one-hop access point may be connected (e.g., through a mesh network) with each other to provide an end-to-end connectivity with the external network to the electronic device. Thus, the connectivity range of the electronic device to the external network may be extended based on connectivity of the directly connected access point with a one-hop access point connected to the external network. The connectivity range may be extended further based on more than one intermediate access points with a certain access point (an n-hop access point) being connected to the external network. Also, based on the distance of the electronic device with nearby access points, a handover between access points in the mesh network may take place. Such handovers may maintain a signal strength of the connection of the electronic device to the external network, while the mobility of the electronic device may also be maintained.

FIG. 1 is a block diagram that illustrates an exemplary network environment for external network connectivity based on access point handover through mesh network, in accordance with an embodiment of the disclosure. With reference to FIG. 1, there is shown a network environment 100. The network environment 100 may include an electronic device 102, a first access point 104, a second access point 108, a server 106, and a communication network 110. Further, the network environment 100 may include a first wireless network 104A associated with the first access point 104, and may further include a second wireless network 108A associated with the second access point 108. The first access point 104 may be situated at a first location 114 and the second access point 108 may be situated at a second location 116. In FIG. 1, there is further shown a user 112 who may be associated with and/or control the operation of the electronic device 102.

The electronic device 102 may include suitable logic, circuitry, interfaces, and/or code that may be configured to detect the first access point 104 associated with the first wireless network 104A within a first predefined radius of the electronic device 102. The electronic device 102 may establish a first connection with the first wireless network 104A, based on the first access point 104 being within the first predefined radius. Further, the electronic device 102 may determine whether an external network is accessible, based on the established first connection. The electronic device 102 may control detection of the second access point 108 associated with the second wireless network 108A within a second predefined radius from the detected first access point 104. The first wireless network 104A and the second wireless network 108A may correspond to a mesh network of a set of interconnected access points. The electronic device 102 may determine whether the external network is accessible from the second access point 108, through the mesh network. Further, the electronic device 102 may control establishment of a second connection between the first access point 104 point and the second access point 108, based on the external network being accessible from the second access point 108, through the mesh network. Examples of the electronic device 102 may include, but are not limited to, a computing device, a smartphone, a cellular phone, a mobile phone, a gaming device, a mainframe machine, a server, a computer workstation, a communication device (enabled with or hosting, for example, a computing resource, a memory resource, and a networking resource), a television, a radio device, a display device, and/or a streaming device.

Each of the first access point 104 and the second access point 108 may include a communication medium through which the electronic device 102 and the server 106 may communicate with one another. For example, the first access point 104 (and/or the second access point 108) may be a device that may be configured to provide a wireless connectivity through a wireless local area network, or WLAN, typically in a home, an office, a building, or any other indoor or outdoor premises. The first access point 104 (and/or the second access point 108) may correspond to, for example, a Wi-Fi router, a Wi-Fi hotspot, switch, or hub via an Ethernet cable, for connection to an external network, through one or more other access points and/or servers.

In an embodiment, the first access point 104 may be associated with the first wireless network 104A within a first predefined radius of the electronic device 102. Further, the second access point 108 may be associated with the second wireless network 108A within a second predefined radius of the first access point 104. The first wireless network 104A and the second wireless network 108A may correspond to a mesh network of a set of interconnected access points. Each of the first wireless network 104A and the second wireless network 108A may be defined by a coverage area (CA) associated with the first access point 104 and the second access point 108, respectively. In an embodiment, a coverage area of an access point may be a certain area that is within proximity of the particular access point in which a device may be able to connect to another device or any access point, through the particular access point. In an example, the coverage area may have a regular (e.g. circular, rectangular, etc.) shape or an irregular shape. In case, the coverage area has a circular shape, the coverage area of the access point may be calculated by a radius (r) associated with a connectivity provided by the access point. For example, the coverage area may be calculated using equation (1):

$$CA = \pi r^2 \quad (1)$$

Examples of the first wireless network 104A and the second wireless network 108A include, but are not limited to, the Internet, a cloud network, a radio frequency (RF) connection, a cellular network or a wireless mobile network (such as Long-Term Evolution and $5^{th}$ Generation (5G) New Radio (NR)), a satellite communication system (using, for example, low earth orbit satellites), a Wireless Fidelity (Wi-Fi) network, a Personal Area Network (PAN), a Local Area Network (LAN), or a Metropolitan Area Network (MAN), a Low-Power Wide Area Network (LPWAN), an ultra-wideband (UWB) network, a sensor network, a Bluetooth network, or a Zigbee network. In an embodiment, the first access point 104 and second access point 108 may correspond to a mesh network, where the distance (d) between the first access point 104 and second access point 108 may be equation (2) or (3), as follows:

$$d = r + \Delta r \quad (2)$$

$$d = R + \Delta R \quad (3)$$

Where, $\Delta r = R - r$, when $r < R$;

$\Delta R = r - R$, when $r > R$;

"R" may represent a radius associated with the coverage area of the second wireless network 108A, and "r" may represent a radius associated with the coverage area of the first wireless network 104A.

In an embodiment, the value of Δr or ΔR may be a positive or a negative number based on a placement of the access points. Further, the value of Δr or ΔR may be 0 in case the second access point 108 is situated on an edge of the coverage area of the first wireless network 104A associated with the first access point 104. For example, a mesh network may include only two access points, such as, the first access point 104 and the second access point 108. The second access point 108 may be situated on the edge of the coverage area associated with the first access point 104. In such case, if the connectivity radius (such as, "r") of the first access point 104 is "10" and the connectivity radius (such as, "R") of the second access point 108 is "12", then the distance (such as, "d") between the access points may be "12" (i.e., d=10+(12−10)).

The server 106 may include suitable logic, circuitry, and interfaces, and/or code that may be configured to detect the first access point 104 associated with the first wireless network 104A within the first predefined radius of the electronic device 102. The server 106 may establish a first connection with the first wireless network 104A, based on the first access point 104 being within the first predefined radius. Further, the server 106 may determine whether an external network is accessible, based on the established first connection. The server 106 may control detection of the second access point 108 associated with the second wireless network 108A within the second predefined radius from the detected first access point 104. The server 106 may determine whether the external network is accessible from the second access point 108, through the mesh network and may control establishment of a second connection between the first access point 104 point and the second access point 108, based on the external network being accessible from the second access point 108, through the mesh network.

The server 106 may be implemented as a cloud server and may execute operations through web applications, cloud applications, HTTP requests, repository operations, file transfer, and the like. Other example implementations of the server 106 may include, but are not limited to, a database server, a file server, a web server, a media server, an application server, a mainframe server, a machine learning server (enabled with or hosting, for example, a computing resource, a memory resource, and a networking resource), or a cloud computing server.

In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106 and the electronic device 102, as two separate entities. In certain embodiments, the functionalities of the server 106 can be incorporated in its entirety or at least partially in the electronic device 102 without a departure from the scope of the disclosure.

The communication network 110 may include a communication medium through which the electronic device 102 and the server 106 may communicate with one another. The communication network 110 may be one of a wired connection or a wireless connection. Examples of the communication network 110 may include, but are not limited to, the Internet, a cloud network, Cellular or Wireless Mobile Network (such as Long-Term Evolution and $5^{th}$ Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 502.11, light fidelity (Li-Fi), 502.16, IEEE 502.11s, IEEE 502.11g, multi-hop communication, wireless access point (AP), device to device communication, cellular communication protocols, and Bluetooth (BT) communication protocols.

The first location 114 may be associated with the first wireless network 104A. The first location 114 may include the first access point 104 that may be associated with the first wireless network 104A within the first predefined radius of the electronic device 102. For example, the first location 114 may be defined as a point (e.g. an address, coordinates, etc.), or as an area (e.g. an area defined by the connectivity area of the first access point 104) with a regular (e.g. circular, rectangular, etc.) or irregular shape associated with the first wireless network 104A.

The second location 116 may be associated with the second wireless network 108A. The second location 116 may include the second access point 108 associated with the second wireless network 108A within the second predefined radius from the first access point 104. Further, the first location 114 and second location 116 may have overlapping regions as the first wireless network 104A and the second wireless network 108A may be associated with a mesh network. For example, the second location 116 may be defined as a point (e.g. an address, coordinates, etc.), or as an area (e.g. an area defined by the connectivity area of the second access point 108) with a regular (e.g. circular, rectangular, etc.) or irregular shape associated with the first wireless network 104A.

In operation, the electronic device 102 may be configured to detect the first access point 104. The first access point 104 may be associated with the first wireless network 104A within the first predefined radius of the electronic device 102. The first predefined radius may be the radius associated with the connectivity area of the first wireless network 104A. Further, the first access point 104 may correspond to a mesh network of a set of interconnected access points. The first access point 104 may be the intermediate device that may be configured to provide accessibility of the external network associated with the mesh network to the electronic device 102. The accessibility to the external network may be provided either directly or through one or more other access points, by the first access point 104. The first access point 104 may establish a wireless network connection with the electronic device 102 associated with the user 112. Details related to the detection of the first access point 104 are further described, for example, in FIG. 3A (at 302).

The electronic device 102 may be configured to establish the first connection of the electronic device 102 with the first wireless network 104A. The first connection may be established between the electronic device 102 and the first wireless network 104A based on the first access point 104 that may be within the first predefined radius of electronic device 102. The first connection may be a wired or a wireless communication of the electronic device 102 with the first access point 104. The first connection may include, but is not limited to, a daisy-chain connection, a Bluetooth network connection, a Wi-Fi network connection, a cellular network connection, a sensor network connection, a near-field connection, a radio-frequency (RF) network connection, a satellite network connection, or other suitable network connection. Details related to the establishment of the first connection are further described, for example, in FIG. 3A (at 304).

The electronic device 102 may be configured to determine an external network accessibility. The accessibility of the external network associated with the mesh network may be determined based on the established first connection. The external network accessibility may be determined based on a connectivity between the electronic device 102 with the first access point 104 and a connectivity of the first access point 104 with the external network. The external network accessibility of the first access point 104 may depend upon transmission power of the first access point 104, locations, and physical structures of the buildings, premises, or campus on which the first access point 104 may be located. Details related to the external network accessibility are further described, for example, in FIG. 3A (at 306).

The electronic device 102 may be configured to control detection of the second access point 108. The second access point 108 may be associated with the second wireless network 108A within the second predefined radius from the detected first access point 104. The second predefined radius may be the radius associated with the connectivity area of the first access point 104. Further, the second access point 108 correspond to the mesh network of the set of interconnected access points. The second access point 108 may be an intermediate device that may be configured to provide accessibility of the external network associated with the mesh network. The second access point 108 may establish a wireless network connection with the first access point 104 associated with the electronic device 102. Details related to the detection of the second access point 108 are further described, for example, in FIG. 3A (at 308).

The electronic device 102 may be configured to determine external network accessibility from the second access point 108. The accessibility of the external network may be detected through the mesh network. The external network accessibility may be determined based on the connectivity between the second access point 108 with the external network. The external network accessibility of the second access point 108 may depend upon transmission power, locations, and the physical structure of the building, premises, or campus on which the second access point 108 may be located. Details related to the external network accessibility are further described, for example, in FIG. 3A (at 310).

The electronic device 102 may be configured to control the establishment of the second connection. The second connection may be established between the first access point 104 and second access point 108. The control of the establishment of the second connection may be based on the external network being accessible from the second access point, through the mesh network. The second connection may include, but is not limited to, a daisy-chain connection, a Bluetooth network connection, a Wi-Fi network connection, a cellular network connection, a sensor network connection, a near-field connection, a radio-frequency (RF) network connection, a satellite network connection, or other suitable network connection. Details related to the second connection are further described, for example, in FIG. 3A (at 312).

To connect to external networks, an electronic device may connect to an access point, such as, a base station. The access point may establish a connection between the electronic device and the external networks. Typically, there may be various limitations in the connection between the electronic device and the external networks, via the access points. For example, a signal strength of the connection may reduce with distance of the electronic device and the access point. The weaker is the signal strength, the lower may be the quality of a communication channel that may be established between the electronic device and the external network. However, a reduction of the distance between the electronic device and the access point may improve the signal strength, but may reduce the mobility of the electronic device. In such a scenario, the electronic device may be moved within a limited region in a vicinity of the access point for better signals and connectivity.

The electronic device 102 of the present disclosure may provide connection with an external network (e.g., the communication network 110) through an access point handover in a mesh network including a set of interconnected access points. The electronic device 102 may detect an access point (e.g., the first access point 104) within a certain radius (e.g., the first predefined radius) from the electronic device 102. In case, an access point is identified within the particular radius from the electronic device 102, the electronic device 102 may establish a connection with the access point (e.g., the first access point 104) through a wireless network (e.g., the first wireless network 104A) associated with the particular access point. The electronic device 102 may then determine whether an external network (e.g., the communication network 110) is accessible from the access point. In case, the communication network 110 is inaccessible directly from the access point, an accessibility to the communication network 110 from another access point (e.g., the second access point 108) within a certain radius (e.g., the second predefined radius) of the initial access point may be determined. In case, the communication network 110 is determined to be accessible from the other access point (i.e., a one-hop access point), the initial access point (e.g., the first access point 104) and the one-hop access point (e.g., the second access point 108) may be connected (e.g., through a mesh network) with each other to provide an end-to-end connectivity with the communication network 110 to the electronic device 102. Thus, the connectivity range of the electronic device 102 to the communication network 110 may be extended based on connectivity of the directly connected access point with a one-hop access point connected to the communication network 110. The connectivity range may be extended further based on more than one intermediate access points with a certain access point (an n-hop access point) being connected to the communication network 110. Also, based on the distance of the electronic device 102 with nearby access points, a handover between access points in the mesh network may take place. Such handovers may maintain a signal strength of the connection of the electronic device 102 to the communication network 110, while the mobility of the electronic device 102 may also be maintained.

Figure 2:
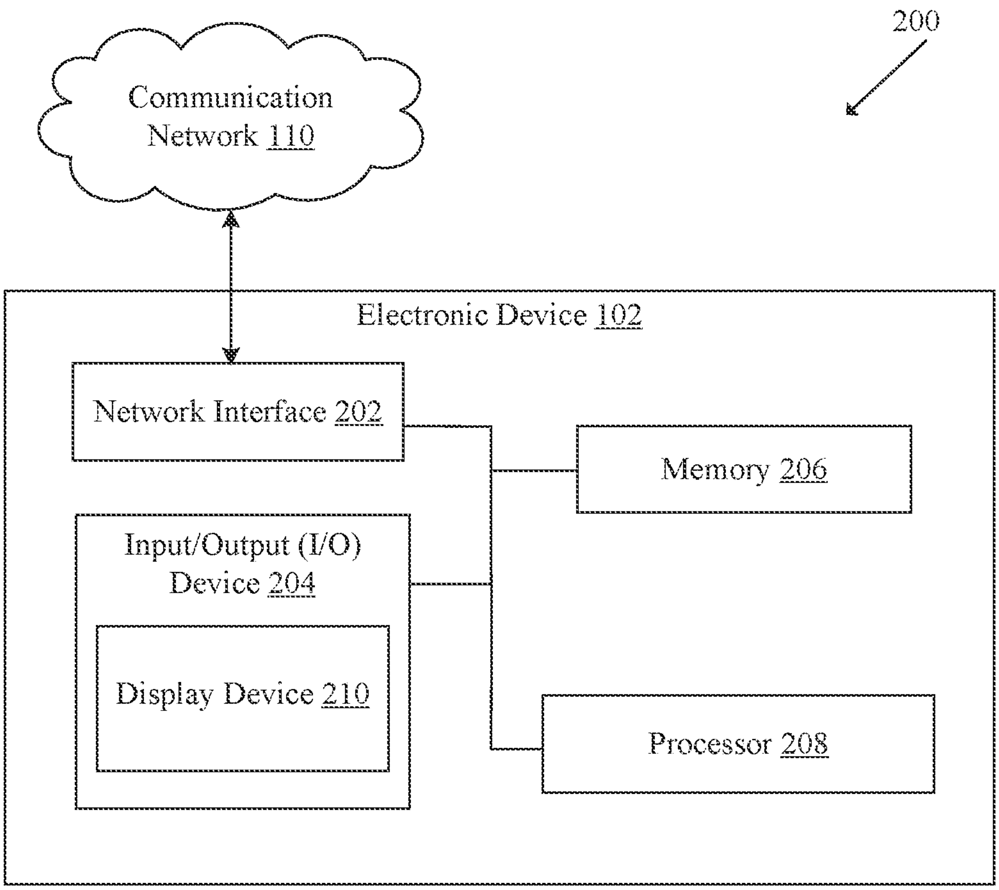
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown the exemplary electronic device 102. The electronic device 102 may include a network interface 202, an input/output (I/O) device 204, a memory 206, and a processor 208. The memory 206 may store the connection information. The input/output (I/O) device 204 may include a display device 210.

The network interface 202 may include suitable logic, circuitry, interfaces, and/or code that may be configured to facilitate communication between the electronic device 102 and the server 106, via the communication network 110. The network interface 202 may be implemented by use of various known technologies to support wired or wireless communication of the electronic device 102 with the communication network 110. The network interface 202 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 202 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 502.11a, IEEE 502.11b, IEEE 502.11g or IEEE 502.11n), voice over Internet Protocol (VOIP), light fidelity (Li-Fi), Worldwide Interoperability for Microwave Access (Wi-MAX), a protocol for email, instant messaging, and a Short Message Service (SMS).

The I/O device 204 may include suitable logic, circuitry, interfaces, and/or code that may be configured to receive an input and provide an output based on the received input. For example, the I/O device 204 may receive a user input indicative of an instruction or intention of a user (e.g., the user 112) to connect the electronic device 102 with any of network, such as, the first wireless network 104A, the second wireless network 108A (directly or indirectly through a mesh network), or any other network with enhanced connectivity. The I/O device 204 may be further configured to display or render information indicative of an establishment of the connection with any of the networks and also parameters corresponding to the established connection (for example, data transmission speed, bit error rate, and signal strength). The I/O device 204 may include the display device 210. Examples of the I/O device 204 may include, but are not limited to, a display (e.g., a touch screen), a keyboard, a mouse, a joystick, a microphone, or a speaker. Examples of the I/O device 204 may further include braille I/O devices, such as, braille keyboards and braille readers.

The memory 206 may include suitable logic, circuitry, interfaces, and/or code that may be configured to store one or more instructions to be executed by the processor 208. The one or more instructions stored in the memory 206 may be configured to execute the different operations of the processor 208 (and/or the electronic device 102). The memory 206 may be further configured to store information associated with the first connection and the second connection. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The processor 208 may include suitable logic, circuitry, and/or interfaces that may be configured to execute program instructions associated with different operations to be executed by the electronic device 102. The operations may include the detection of the first access point 104, the establishment of the first connection, the determination of accessibility of the external node from the electronic device 102, the control for detection of the second access point 108, the determination of the accessibility of the external network from the second access point 108, and the control for the establishment of the second connection. The processor 208 may include one or more processing units, which may be implemented as a separate processor. In an embodiment, the one or more processing units may be implemented as an integrated processor or a cluster of processors that perform the functions of the one or more specialized processing units, collectively. The processor 208 may be implemented based on a number of processor technologies known in the art. Examples of implementations of the processor 208 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The display device 210 may include suitable logic, circuitry, and interfaces that may be configured to display or render information associated with the establishment of the first connection and/or the second connection. For example, the display device 210 may display or render information such as, a duration of a connection, a download/upload speed of the connection, a signal strength of the connection, a bit error rate of the connection, and a count of data bits transmitted or received. The display device 210 may be a touch screen which may enable a user (e.g., the user 112) to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the processor 208 to connect the electronic device 102 to an access point that has accessibility of the external network are described further, for example, in FIG. 3A.

Figure 3A:
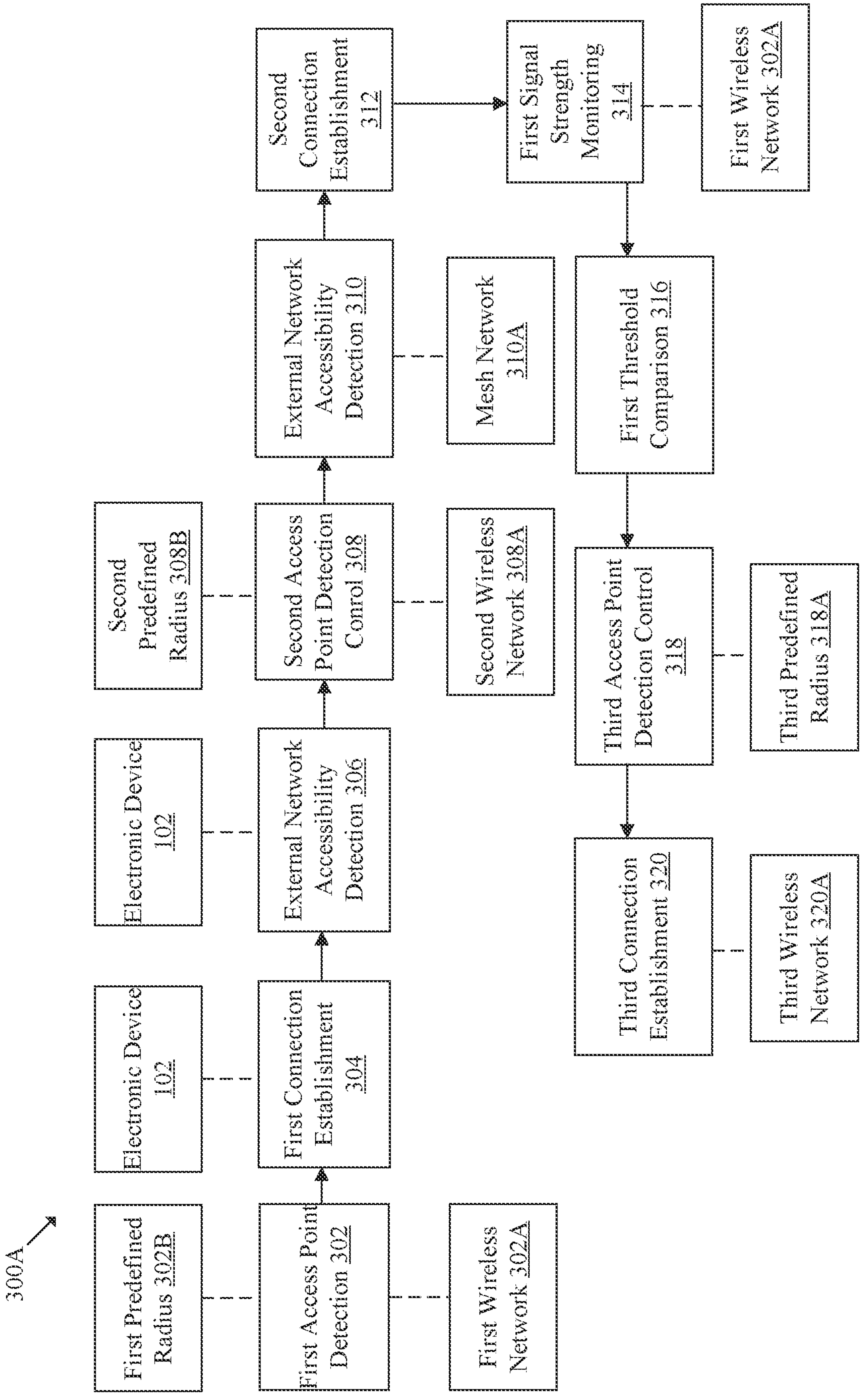
FIG. 3A is a diagram that illustrates an exemplary processing pipeline for external network connectivity based on access point handover through mesh network, in accordance with an embodiment of the disclosure.

FIG. 3A is a diagram that illustrates an exemplary processing pipeline for external network connectivity based on access point handover through mesh network, in accordance with an embodiment of the disclosure. FIG. 3A is explained in conjunction with elements from FIG. 1 and FIG. 2. With reference to FIG. 3A, there is shown an exemplary processing pipeline 300A that illustrates exemplary operations from 302 to 320 for implementation of external network connectivity based on access point handover through mesh network. The exemplary operations 302 to 320 may be executed by any computing system, for example, by the electronic device 102 of FIG. 1 or by the processor 208 of FIG. 2. In FIG. 3A, there are further shown, the electronic device 102, a first wireless network 302A, a first predefined radius 302B, a second wireless network 308 A, a second predefined radius 308B, a mesh network 310A, a third predefined radius 318A, and a third wireless network 320A.

At 302, an operation for a detection of a first access point may be executed. In an embodiment, the processor 208 may be configured to detect the first access point 104 associated with a first wireless network (e.g., the first wireless network 302A) within the first predefined radius (e.g., the first predefined radius 302B) of the electronic device 102. The first access point 104 may be associated with the first wireless network 104A and may be within the first predefined radius of the electronic device 102. The first predefined radius may be the radius associated with a connectivity area of the first wireless network 302A around the first access point 104. Further, the first access point 104 correspond to the mesh network of a set of interconnected access points. In an embodiment, the first access point 104 may be an intermediate device that may be configured to provide an accessibility of an external network associated with the mesh network to the electronic device 102. The first access point 104 may establish a wireless network connection with the electronic device 102 associated with the user 112. Examples of the first access point 104 may include, but is not limited to, a Wi-Fi router, a mobile hotspot, a Bluetooth device, a ZigBee device, a sensor network hub, or a cellular base station.

In an embodiment, the first access point 104 may correspond to a Wi-Fi router connected to the electronic device 102 associated with the user 112. The electronic device 102 may be connected to the Wi-Fi router, in case, the Wi-Fi is within the first predefined radius 302B of the electronic device 102. It may be appreciated that in certain cases the Wi-Fi router may be an intermediate device configured to provide the electronic device 102 with connectivity to the external network (such as, the internet). For example, the electronic device 102 may be operated by the user 112 may to watch a video on the electronic device 102 (such as, a mobile device or a Wi-Fi enabled television). The Wi-Fi router may correspond to a mesh network (e.g., the mesh network 310A) of a plurality of Wi-Fi routers, wherein at least one of the plurality of Wi-Fi routers may be connected to an external network, such as, the Internet. In order to connect to the internet, the electronic device 102 may connect to the Wi-Fi router in the first predefined radius.

In an embodiment, the first access point 104 may correspond to a mobile hotspot connected to the electronic device 102 associated with the user 112. The electronic device 102 may be connected to the mobile hotspot, in case, is the mobile hotspot is within the first predefined radius 302B of the electronic device 102. It may be appreciated that the mobile hotspot may be an intermediate device configured to provide the electronic device 102 with connectivity to the external network (such as the internet). For example, the electronic device 102 may be used by the user 112 to stream games on the electronic device 102 (such as, a mobile device or a smart television). Further, the mobile hotspot may correspond to a mesh network of a plurality of the mobile hotspots or the Wi-Fi router. In order to connect to the internet, the electronic device 102 may connect to the mobile hotspot in the first predefined radius.

At 304, an operation for establishment of a first connection may be executed. The processor 208 may be configured to establish the first connection of the electronic device 102 with the first wireless network 302A, based on the first access point 104 being within the first predefined radius 302B. The first connection may be a wired or a wireless connection of the electronic device 102 with the first access point 104. The first connection may include, but is not limited to, a daisy-chain connection, a Bluetooth network connection, a Wi-Fi network connection, a cellular network connection, a sensor network connection, a near-field connection, a radio-frequency (RF) network connection, a satellite network connection, or other suitable network connection.

In an embodiment, the first connection may correspond to a Wi-Fi network connection. The electronic device 102 may be a display device (such as, a Wi-Fi-enabled television) and the first access point 104 may be a first Wi-Fi router with the first wireless network 104A. The first connection may be established using a Wi-Fi discovery routine between the television and the first Wi-Fi router. Thus, the television may identify the nearest router network, then passes data or messages to connect back to the first Wi-Fi router. The television may connect to the first Wi-Fi router if the first Wi-Fi router provides accessibility to an external network, such as, the Internet.

At 306, an operation for a determination of an external network accessibility may be executed. The processor 208 may be configured to determine whether an external network is accessible from the electronic device 102, based on the established first connection. The accessibility of the external network from the electronic device 102 may be determined based on the connectivity of the electronic device 102 and/or the first access point 104 with the external network. In an embodiment, the external network accessibility through the first access point 104 may be based on a transmission power of the first access point 104, a location, and a physical structure of a building, a premises, or campus on which the first access point 104 may be located. In an example, the external network may be, but is not limited to, an internet, a Local Area Network (LAN), a Metropolitan Area Network (MAN), a Wide Area Network (WAN), a public switched telephone network (PSTN), a mobile telephone switching office (MTSO), or a satellite network.

In an embodiment, the external network correspond to the Internet, which may be accessed through the server 106. The server 106 may be associated with an Internet Service Provider (ISP) or any other network service provider (such as, a mobile/cellular network service provider). The electronic device 102 may be a display device (such as, a mobile device). In an example, the mobile device may establish a first connection with the first access point 104 (such as, a Wi-Fi router) to access the Internet. The Wi-Fi router may further determine the accessibility of the internet based on the first connection and at least one of, the transmission power of the first access point 104, the locations, and the physical structure of the building, the premises, or campus on which the first access point 104 may be located. The Wi-Fi router may act as an intermediate device configured to provide the mobile device with an accessibility to the Internet.

At 308, an operation for control of detection of a second access point detection may be executed. The processor 208 may be configured to control detection of the second access point 108 associated with the second wireless network 308A within the second predefined radius 308B from the detected first access point 104. The second predefined radius may be the radius associated with a connectivity area or a coverage range of the first access point 104. Further, the second access point 108 may correspond to a mesh network (e.g., the mesh network 310A) of the set of interconnected access points. The second access point 108 may be an intermediate device that may provide accessibility of the external network associated with the mesh network 310A. The second access point 108 may establish a wireless network connection with the first access point 104 associated with the electronic device 102. The second access point 108 may be a Wi-Fi router, a Bluetooth device, a ZigBee device, a base station, and the like. The detection of the second access point 108 may be similar to the detection of the first access point 104 (as described in FIG. 3A, at 302).

In an embodiment, the second access point 108 may correspond to a Wi-Fi router connected to the first access point 104 associated with the electronic device 102. In one scenario, the first access point 104 may also be another Wi-Fi router corresponding to a television (such as, the electronic device 102) associated with the user 112. The television may render video, that may be streamed on the Internet, for the user 112. In case, the external network, i.e., the Internet, is not accessible from the television or the first access point 104, i.e., a first Wi-Fi router, then, the detection of the second access point 108, i.e., a second Wi-Fi router, may be controlled. In an example, I second Wi-Fi router may be within the second predefined radius 308B from the detected the first Wi-Fi router. (i.e., where the first Wi-Fi router and the second Wi-Fi router may be within each other's coverage area). For example, the second Wi-Fi router (i.e., the second access point 108) may be within the sec The first Wi-Fi router and the second Wi-Fi router may correspond to the mesh network of the set of interconnected Wi-Fi routers. In order to connect to the internet, the television may connect to the first Wi-Fi router within the first predefined radius of the television. Further, the first Wi-Fi router may be connected to the determined the second Wi-Fi router, wherein the second Wi-Fi router may be within the second predefined radius of the first predefined radius.

At 310, an operation for determination of an accessibility of the external network accessibility may be executed. In an embodiment, the processor 208 may be configured to control determination of whether the external network (e.g., the communication network 110) is accessible from the second access point 108, based on the external network being inaccessible from the electronic device 102. The second access point 108 may be determined through the mesh network 310A, wherein the mesh network 310A may be with the set of interconnected access points including the first access point 104 and the second access point 108. The external network accessibility may be determined based on the connectivity of the second access point 108 with the external network. The external network accessibility of the second access point 108 may be based on the transmission power, the locations, and the physical structure of the building, premises, or campus on which the second access point 108 may be located. In an example, the external network may be, but is not limited to, an internet, a Local Area Network (LAN), a Metropolitan Area Network (MAN), a Wide Area Network (WAN), a public switched telephone network (PSTN), a mobile telephone switching office (MTSO), and a satellite networks. In an embodiment, the external network may be the internet provided by the server 106. For example, the second access point 108 may be the second Wi-Fi router. In such a scenario, the second Wi-Fi router may determine the accessibility of the internet through the mesh network.

At 312, an operation for control of the second connection establishment may be executed. The processor 208 may be configured to control establishment of a second connection between the first access point 104 and the second access point 108, based on the external network being accessible from the second access point 108, through the mesh network 310A. The electronic device 102 may be connected to the external network (e.g., the Internet and/or the communication network 110) through the established first connection and the control of the established second connection. In case, the second access point 108 is able to access the external network, then the second access point 108 may establish the second connection with the first access point 104 to provide the electronic device 102 with an access to the external network.

In an embodiment, the established second connection may be a Wi-Fi connection, and the external network may be the Internet. The electronic device 102 may be a display device (such as, a television), and the first access point 104 may be the first Wi-Fi router associated with the first wireless network 302A. Further, the second access point 108 may be a second Wi-Fi router associated with the second wireless network 308A. For example, the Wi-Fi connection establishment between the first Wi-Fi router and the second Wi-Fi router may be based on the Internet accessibility from the second Wi-Fi router. The accessibility of Internet from the second Wi-Fi router may be based on the mesh network 310A. The television may connect directly to the first Wi-Fi router and may access the internet through the established first connection (between the first Wi-Fi router) and the established second connection (between the second Wi-Fi router).

In an embodiment, the second connection may be established using a Wi-Fi discovery routine between the first Wi-Fi router and the second Wi-Fi router. The first Wi-Fi router may identify the nearest Wi-Fi router (e.g., the second Wi-Fi router) with an accessibility to internet, then pass data or message to connect to the second Wi-Fi router, via the first Wi-Fi router directly connected to the television. The television may establish the first connection with the first Wi-Fi router. Further, the first Wi-Fi router may provide accessibility of the Internet through the second connection of the first Wi-Fi router and the second Wi-Fi router to the television. That is, the first Wi-Fi router and the second Wi-Fi router may act as intermediate devices to provide the television accessibility of the Internet.

In an embodiment, a number of the one or more other access points through which the external network is accessible may be less than a predefined hop value. The predefined hop value may refer to a predefined number of access points through which data passes from the electronic device 102 to server 106 (depending on routing protocol, that may include the source/destination, that is, the first hop may be counted as hop 0 or hop 1). The hop count may be a rough measure of a routing distance between the electronic device 102 and the server 106. For example, the first access point 104 may be the first Wi-Fi router, the second access point 108 may be the second Wi-Fi router and the electronic device 102 may be a mobile device. The first Wi-Fi router and the second Wi-Fi router may be in vicinity of each other, and the first Wi-Fi router may be in the vicinity of the mobile device. The first Wi-Fi router and the second Wi-Fi router may act as intermediate devices. Further, the mobile device may establish the first connection with the first Wi-Fi router, and the first Wi-Fi router may establish the second connection with the second Wi-Fi router. Furthermore, the second Wi-Fi router may be wirelessly connected to the external network (i.e., the internet) via the server 106. Thus, the mobile device may connect with the internet via the intermediate devices. Thus, in the current case, the hop value for the Internet connection may be 2 (for example, hop 0 and hop 1).

In an embodiment, a first hop may be a scenario in which a data packet may be passed from the first connection (between the electronic device 102 and the first access point 104) to the second connection (between the first access point 104 and the second access point 108). Further, a second hop may be a scenario in which the data packet may be passed from the second connection to a connection between the second access point 108 and the server 106. For example, a first hop may be associated with a data packet communication between the television to the second Wi-Fi router, via the first Wi-Fi router. Further, a second hop may be associated with a data packet communication between the second Wi-Fi router and the server 106 (i.e., the external network provider).

At 314, an operation for first signal strength monitoring may be executed. The processor 208 may be configured to monitor a first signal strength associated with the first wireless network 302A, at the electronic device 102. The first signal strength may correspond to a quality of the radio frequency (RF) signals (or electro-magnetic (EM) signals) received at the electronic device 102, wherein the electronic device 102 may be located at a certain distance from the first access point 104 and within a coverage range of the first wireless network 104A. In an example, the first signal strength may be expressed in dB-microvolts per meter (dBμV/m) or in decibels. For example, the electronic device 102 may receive a signal transmitted from the first access point 104 with a signal to interference plus noise ratio (SINR), a received signal strength index (RSSI), and interference from another access points (such as, the second access point 108 or other access points). The interference from another access points may be received as the first access point 104 may belong a mesh network of the set of interconnected access points.

In an embodiment, the electronic device 102 may be a television and the first access point 104 may be a first Wi-Fi router. For example, the first signal strength of the RF/EM signals received at the television may be monitored. The RF/EM signals may be transmitted by the first Wi-Fi router to the television.

At 316, an operation for the first threshold comparison may be executed. The processor 208 may be configured to compare the first signal strength with a first threshold. The comparison may be performed to determine whether the monitored first signal strength associated with the first wireless network 302A is lower than the first threshold. The processor 208 may be configured to determine whether the monitored first signal strength associated with the first wireless network 302A is lower than the first threshold. The first threshold may refer to a predefined minimum signal level that may be required for the access points or the electronic device 102 to maintain stability in connection such that a noise or a bit error rate of the connection remains within an acceptable range. Further, when the signal strength falls below the first threshold, the connection may become unstable or drop altogether. The first threshold may be adjusted by the user 112 for some access points to optimize the quality of the connection.

In an embodiment, the electronic device 102 may be a television and the first access point 104 may be a first Wi-Fi router. For example, the television may be connected to the first Wi-Fi router and may render video content, streamed from the Internet via the first Wi-Fi router. In such a scenario, the television may monitor the first signal strength from the first Wi-Fi router. Further, the television may determine whether the first signal strength is lower than the first threshold. In case, the first signal strength received from the first Wi-Fi router is lower than the first threshold, then the quality of connection provided by the first Wi-Fi router may be low.

In an embodiment, the external network may be accessible from one or more access points of the mesh network. For example, the one or more access points (other than the first access point and the second access point) from which the external network may be accessible may include access points, such as, a third access point, a fourth access point, and a fifth access point.

At 318, an operation for control of detection of the third access point may be executed. The processor 208 may be configured to detect a third access point associated with a third wireless network (e.g., the third wireless network 320A) within a third predefined radius (e.g., the third predefined radius 318A) of the electronic device 102. The detection of the third access point may be based on the determination that the monitored first signal strength associated with the first access point 104 is lower than the first threshold. Further, the third predefined radius 318A may correspond to a radius associated with a connectivity area of the third access point. The third access point may be detected as an access point capable of connecting with the electronic device 102, in case, a distance between the third access point and the electronic device 102 is less than or equal to the third predefined radius 318A. In such a case, the electronic device 102 may be within the connectivity area of the third access point. The third access point may correspond to the mesh network of the set of interconnected access points. The third access point may be an intermediate device that may provide an accessibility of the external network associated with the mesh network. Furthermore, the third access point may establish a wireless network connection with the electronic device 102 associated with the user 112. Examples of the third access point may include, but is not limited to, a Wi-Fi router, a mobile hotspot, a Bluetooth device, a ZigBee device, and a base station.

In an embodiment, the third access point may correspond to a third Wi-Fi router. Further, the electronic device 102 may correspond to a television associated with the user 112. The television may be initially connected with the first Wi-Fi router i.e., first access point 104. The television may detect the third Wi-Fi router based on the determination that the first signal strength of the first Wi-Fi router is lower than the first threshold value. The television may be within a predefined radius (e.g., the third predefined radius 318A) of the third Wi-Fi router.

At 320, an operation for a third connection establishment may be executed. The processor 208 may be configured to may be configured to establish the third connection of the electronic device 102 with a third wireless network (e.g., the third wireless network 320A) based on the third access point being within the third predefined radius 318A. The third connection may be a wired or a wireless communication of the electronic device 102 with the third access point. The third connection may include, but is not limited to, a daisy-chain connection, a Bluetooth network connection, a Wi-Fi network connection, a cellular network connection, a sensor network connection, a radio-frequency (RF) network connection, a satellite network connection, or other suitable network connection.

In an embodiment, the established third connection may be a Wi-Fi connection. The electronic device 102 may be a display device (such as, a television), the first access point 104 may be a first Wi-Fi router and the third access point may be a third Wi-Fi router. The third connection may be established using a Wi-Fi discovery routine between the television and the third Wi-Fi router. In case, for example, the television determines that a connectivity with the first Wi-Fi router corresponds to a low quality connection, then the television may control identification of y a nearest router (by the first Wi-Fi router), and pass data or messages to connect to the nearest router, such as, the third Wi-Fi router. The television may establish the third connection with the third Wi-Fi router as the third Wi-Fi router may provide an accessibility of the external network (such as the internet) with a better quality. It may be appreciated that the electronic device 102 may handover connections between the access points through the mesh network to provide better quality connection to the external network. Furthermore, the third Wi-Fi router may be an intermediate device to provide the television with connectivity to the external network (such as the Internet).

In an embodiment, the electronic device 102 may access the external network through the detected third access point, upon a determination that a second signal strength associated with the third wireless network 320A is higher than the first threshold. In such a scenario, the electronic device 102 may perform the handover from the first access point 104 to the third access point. For example, a television may connect to a first Wi-Fi router to access the Internet. In case, the first signal strength of the first Wi-Fi router is less than the first threshold value and the second signal strength of the third access point (such as, a third Wi-Fi router) is greater than the first threshold, the television may establish the third connection with the third Wi-Fi router. The third connection may be established based on a handover of connectivity with the electronic device 102 between the first Wi-Fi router and the third Wi-Fi router. Thus, based on the establishment of the third connection with the third Wi-Fi router, the television may be able to access the internet through the third Wi-Fi router.

Figure 3B:
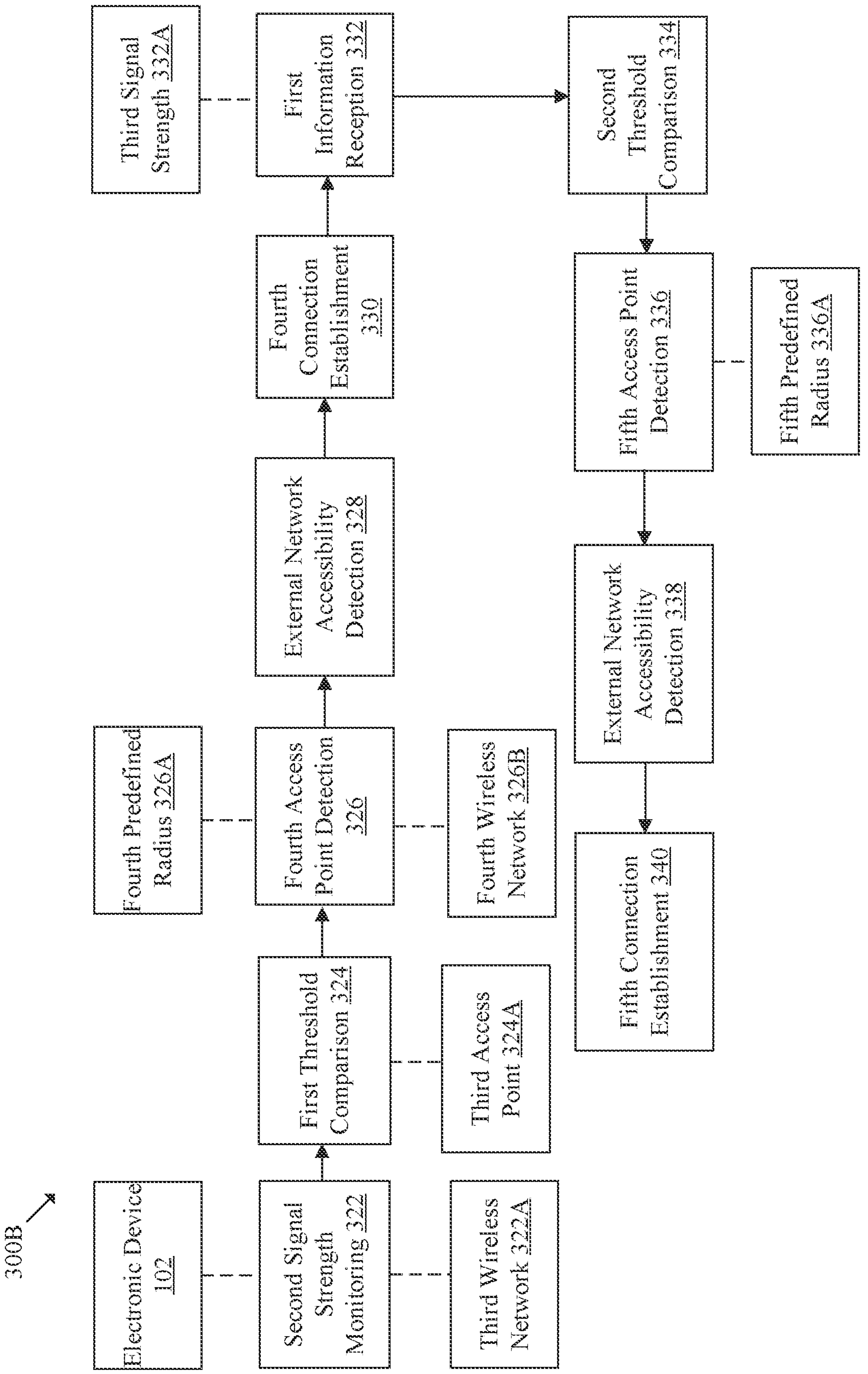
FIG. 3B is a diagram that illustrates an exemplary processing pipeline for external network connectivity based on access point handover through mesh network, in accordance with an embodiment of the disclosure.

FIG. 3B is a diagram that illustrates an exemplary processing pipeline for external network connectivity based on access point handover through mesh network, in accordance with an embodiment of the disclosure. FIG. 3B is explained in conjunction with elements from FIG. 1, FIG. 2, and FIG. 3A. With reference to FIG. 3B, there is shown an exemplary processing pipeline 300B that illustrates exemplary operations from 322 to 340 for implementation of external network connectivity based on access point handover through mesh network. The exemplary operations 322 to 340 may be executed by any computing system, for example, by the electronic device 102 of FIG. 1 or by the processor 208 of FIG. 2. In FIG. 3B, there are further shown, the electronic device 102, a third wireless network 322A, a third access point 324A, a fourth predefined radius 326A, a fourth wireless network 326B, a third signal strength 332A, and a fifth predefined radius 336A.

At 322, an operation for monitoring of a second signal strength may be executed. The processor 208 may be configured to monitor a second signal strength associated with the third wireless network 322A, at the electronic device 102.

The second signal strength may correspond to a quality of the radio frequency (RF) signals (or electro-magnetic (EM) signals) received at the electronic device 102, wherein the electronic device 102 may be located at a certain distance from the third access point 324A and within a coverage range of the third wireless network 322A. In an example, the second signal strength may be expressed in dB-microvolts per meter (dBμV/m) or in decibels. For example, the electronic device 102 may receive a signal transmitted from the third access point 324A with a signal to interference plus noise ratio (SINR), a received signal strength index (RSSI), and interference from another access points (such as, a fourth access point or other access points). The interference from another access points may be received as the third access point 324A may belong a mesh network of the set of interconnected access points.

In an embodiment, the electronic device 102 may be a television and the third access point 324A may be a third Wi-Fi router. For example, the second signal strength of the RF/EM signals received at the television may be monitored. The RF/EM signals may be transmitted by the third Wi-Fi router to the television.

At 324, an operation for the first threshold comparison may be executed. The processor 208 may be configured to compare the second signal strength with the first threshold. The comparison of the second signal strength to the first threshold may be performed to determine whether the monitored second signal strength associated with the third wireless network 322A is higher than the first threshold. The first threshold may refer to a predefined minimum signal level that may be required for access points or the electronic device 102 to maintain a stable connection. In certain cases, when the signal strength falls below the first threshold, the connection may become unstable or drop altogether. Also, when a signal strength is higher than the first threshold, the quality of connectivity between the access point and the electronic device 102 also be higher. The first threshold may be adjusted by the user 112 in some access points to optimize the quality of the connection. Further, the detection of the third access point 324A may be based on the determination that the monitored second signal strength is higher than the first threshold. Upon determination that the second signal strength is higher than the first threshold, the electronic device 102 may establish a third connection with the third access point 324A. Herein, the third access point 324A may be associated with the third wireless network 322A within the third predefined radius of the electronic device 102.

In an embodiment, the electronic device 102 may be a television and the third access point 324A may be a third Wi-Fi router. For example, the television may receive media content from an external network and render the received media content for the user 112*n*. The television may monitor the second signal strength from the third Wi-Fi router. Further, the television may determine whether the second signal strength is higher than the first threshold. Upon determination that the second signal strength associated with the third Wi-Fi router is higher than the first threshold, the television may detect the third access point 324A to establish a third connection with the third access point 324A. As the second signal strength received from the third Wi-Fi router may be higher than the first threshold, a quality of connection provided by the third Wi-Fi router may also be better than quality of connections provided by other Wi-Fi routers, which may be in a vicinity of the electronic device 102.

In an embodiment, the third predefined radius associated with the third access point 324A may correspond to the first predefined radius associated with the first access point 104. Further, the external network may be accessible from one or more access points of the mesh network. Thus, the processor 208 may be configured to determine whether the external network is accessible from the electronic device 102, based on the established third connection.

At 326, an operation for a fourth access point detection may be executed. The processor 208 may be configured to control detection of the fourth access point associated with the fourth wireless network 326B within the fourth predefined radius 326A from the third access point 324A. The control of the detection of the fourth access point may be based on the inaccessibility of the external network from the electronic device 102, via the third access point 324A. Further, the third wireless network 322A and the fourth wireless network 326B may correspond to the mesh network of the set of interconnected access points. Further, the fourth predefined radius 326A may be a radius associated with a connectivity area of the detected third access point 324A. The fourth access point may be an intermediate device that may provide accessibility of an external network associated with a mesh network. Furthermore, the fourth access point may establish a wireless network connection with the third access point. Examples of the fourth access point may include, but is not limited to, a Wi-Fi router, a mobile hotspot, a Bluetooth device, a ZigBee device, and a base station.

In an embodiment, the fourth access point may correspond to a fourth Wi-Fi router. For example, a television (i.e., the electronic device 102) associated with the user 112 may be initially connected with a third Wi-Fi router (i.e., the third access point 324A). Furthermore, the television may detect the fourth Wi-Fi router based on a determination that the external network (e.g., the Internet) may be inaccessible from the electronic device 102, though the third Wi-Fi router. The fourth Wi-Fi router may be within the fourth predefined radius 326A may be from the third Wi-Fi router. In an embodiment, the fourth predefined radius 326A of the fourth access point may correspond to the second predefined radius of the second access point 108. In such case, the fourth wireless network 326B associated with the fourth access point may be different from the second wireless network 108A associated with the second access point 108. Also, the fourth access point may be different from the second access point 108. In another embodiment the fourth wireless network 326B associated with the fourth access point may correspond to the second wireless network 108A associated with the second access point 108. Also, the fourth access point may correspond to the second access point 108.

At 328, an operation for detection (or determination) of an accessibility of the external network from the fourth access point may be executed. The processor 208 may be configured to detect (or determine) whether the external network is accessible from the fourth access point, through the mesh network. The external network accessibility may be determined based on the connectivity of the fourth access point with the external network. The external network accessibility of the fourth access point may be based on a transmission power, locations, and the physical structure of a building, premises, or campus on which the fourth access point may be located. In an example, the external network may be, but is not limited to, an internet, a Local Area Network (LAN), a Metropolitan Area Network (MAN), a Wide Area Network (WAN), a public switched telephone network (PSTN), a mobile telephone switching office (MTSO), and a satellite networks. In an embodiment, the external network may be the Internet accessible through the server 106. Also, the fourth access point may be a fourth Wi-Fi router. For example, the electronic device 102 may determine whether the fourth Wi-Fi router can access the Internet through the mesh network.

At 330, an operation for the fourth connection establishment control may be executed. The processor 208 may be configured to control establishment of a fourth connection between the third access point 324A and the fourth access point, based on the external network being accessible from the fourth access point, through the mesh network. The fourth connection may be established between the third access point and the fourth access point. The electronic device 102 may connect to the external network through the established third connection and the established fourth connection.

In an embodiment, the fourth connection establishment may be a Wi-Fi connection, and the external network may be the internet. The electronic device 102 may be a display device (such as, a television), and the third access point 324A may be a third Wi-Fi router with the third wireless network 322A. Further, the fourth access point may be a fourth Wi-Fi router with the fourth wireless network 326B. For example, the establishment of a Wi-Fi connection between the fourth Wi-Fi router and the third Wi-Fi router may be based on the internet inaccessibility from the third Wi-Fi router. The accessibility of Internet from the fourth Wi-Fi router may depend on the mesh network. Then, the television may connect to the Internet through the established third connection and the established fourth connection.

In an embodiment, the fourth connection may be established using the Wi-Fi discovery routine between the third Wi-Fi router and the fourth Wi-Fi router. Thus, the third Wi-Fi router identifies the nearest the fourth Wi-Fi router network with accessibility of internet, then passes data or message to connect to the third Wi-Fi router. The third Wi-Fi router may establish the fourth connection with the fourth Wi-Fi router. Further, the fourth Wi-Fi router may provide accessibility of the Internet through the fourth connection with the third Wi-Fi router to the television. That is, the third Wi-Fi router and the fourth Wi-Fi router may act as intermediate devices to provide the television with accessibility of the Internet.

At 332, an operation for first information reception may be executed. The processor 208 may be configured to receive the first information indicative of a third signal strength associated with the second wireless network 108A, at the first access point 104. The first information is generated at the first access point 104. The first information may be indicative of the third signal strength that may correspond to the information of the quality of the RF/EM signals received from the second access point 108, wherein the second access point 108 may be located at a certain distance from the first access point 104 and within the coverage range of the first wireless network 104A. In an example, the third signal strength may be expressed in dB-microvolts per meter (dBμV/m) or in decibels. For example, the first access point 104 may receive a signal transmitted from the second access point 108, a signal to interference plus noise ratio (SINR) considering a received signal strength index (RSSI) and interference from another access points (such as, the second access point 108 or others). The interference from another access points may be received as the second access point 108 may correspond to a mesh network of the set of interconnected access points.

In an embodiment, the first access point 104 may be a first Wi-Fi router and the second access point 108 may be a second Wi-Fi router. For example, the first information indicative of the third signal strength of the RF/EM signals received at the first Wi-Fi router may be monitored. The EM signal may be transmitted by the second Wi-Fi router to the first Wi-Fi router.

At 334, an operation for a second threshold comparison may be executed. The processor 208 may be configured to compare the third signal strength with the second threshold, wherein the comparison may be performed to determine whether the third signal strength associated with the second wireless network 108A is lower than the second threshold. The second threshold may refer to a predefined minimum signal level that may be required for the access points or the electronic device 102 to maintain stability in a connection. Further, in case, a signal strength falls below the second threshold, the connection may become unstable or drop altogether. The second threshold may be adjusted by the user 112 in some access points to optimize the quality of the connection.

In an embodiment, the electronic device 102 may be a television, the first access point 104 may be a first Wi-Fi router and the second access point 108 may be a second Wi-Fi router. For example, the television may receive media content from the Internet and render the received media content for the user 112. The television may monitor the first signal strength from the first Wi-Fi router, and further, the television may receive the first information from the first Wi-Fi router. The received first information may be indicative of the third signal strength associated with the second wireless network 108A. The television may determine whether the third signal strength is lower than the second threshold. In case, the third signal strength associated with the second wireless connection is lower than the first threshold, then the quality of connection provided by the second Wi-Fi router may be low.

At 336, an operation for detection of a fifth access point may be executed. The processor 208 may be configured to control detection of the fourth access point associated with a fifth wireless network within the fifth predefined radius 336A from the first access point 104. The control of the detection of the fifth access point may be based on the determination that the third signal strength is lower than the second threshold. Further, the fifth wireless network may correspond to the mesh network of the set of interconnected access points. Further, the fifth predefined radius 336A may correspond to the second predefined radius associated with the second access point 108. The fifth access point may be the intermediate device that provides accessibility of the external network associated with the mesh network. Examples of the fifth access point may include, but is not limited to, a Wi-Fi router, a mobile hotspot, a Bluetooth device, a ZigBee device, and a base station.

At 338, an operation for determination (or detect) of external network accessibility from the fifth access point may be executed. The processor 208 may be configured to determine (or detect) the accessibility of the external network from the fifth access point. The accessibility of the external network form the fifth access point may be determined through the mesh network, wherein the mesh network may be with the set of interconnected access points. The external network accessibility may be determined based on the connectivity of the fifth access point with the external network. The external network accessibility of the fifth access point may be based on a transmission power, locations, and a physical structure of a building, premises, or campus on which the fifth access point may be located. In an example, the external network may be, but is not limited to, an internet, a Local Area Network (LAN), a Metropolitan Area Network (MAN), a Wide Area Network (WAN), a public switched telephone network (PSTN), a mobile telephone switching office (MTSO), and a satellite networks. In an embodiment, the external network may be the Internet that may be connected through the server 106. Also, the fifth access point may be a fifth Wi-Fi router. For example, the fifth Wi-Fi router may determine the accessibility of the internet through the mesh network.

At 340, an operation for control of establishment of a fifth connection may be executed. The processor 208 may be configured to control establishment of a fifth connection between the first access point and the fifth access point, based on the external network being accessible from the fifth access point, through the mesh network. The fifth connection may be established between the first access point 104 and the fifth access point. The electronic device 102 may connect to the external network through the established first connection and the established fifth connection.

In an embodiment, the established fifth connection may be a Wi-Fi connection, and the external network may be the Internet. The electronic device 102 may be a display device (such as, a television), and the first access point 104 may be a first Wi-Fi router associated with the first wireless network 104A. Further, the fifth access point may be a fifth Wi-Fi router associated with the fifth wireless network. For example, the establishment of a Wi-Fi connection between the fifth Wi-Fi router and the first Wi-Fi router may be based on the internet accessibility from the fifth Wi-Fi router. The accessibility of internet from the fifth Wi-Fi router may depend on the mesh network. Then, the television may connect to the internet through the established fifth connection and the established first connection.

In an embodiment, the fifth connection may be established using the Wi-Fi discovery routine between the first Wi-Fi router and the fifth Wi-Fi router. Thus, the first Wi-Fi router may identify a nearest Wi-Fi router (e.g., the fifth Wi-Fi router) with accessibility of internet, and pass data or message to connect to the fifth Wi-Fi router. The first Wi-Fi router may establish the fifth connection with the fifth Wi-Fi router. Further, the fifth Wi-Fi router may provide accessibility of the internet to the television, through the fifth connection with the first Wi-Fi router. The first Wi-Fi router and the fifth Wi-Fi router may act as the intermediate devices to provide the television with accessibility of the Internet.

To connect to external networks, an electronic device may connect to an access point, such as, a base station. The access point may establish a connection between the electronic device and the external networks. Typically, there may be various limitations in the connection between the electronic device and the external networks, via the access points. For example, a signal strength of the connection may reduce with distance of the electronic device and the access point. The weaker is the signal strength, the lower may be the quality of a communication channel that may be established between the electronic device and the external network. However, a reduction of the distance between the electronic device and the access point may improve the signal strength, but may reduce the mobility of the electronic device. In such a scenario, the electronic device may be moved within a limited region in a vicinity of the access point for better signals and connectivity.

The electronic device 102 of the present disclosure may provide connection with an external network (e.g., the communication network 110) through an access point handover in a mesh network including a set of interconnected access points. The electronic device 102 may detect an access point (e.g., the first access point 104) within a certain radius (e.g., the first predefined radius) from the electronic device 102. In case, an access point is identified within the particular radius from the electronic device 102, the electronic device 102 may establish a connection with the access point (e.g., the first access point 104) through a wireless network (e.g., the first wireless network 104A) associated with the particular access point. The electronic device 102 may then determine whether an external network (e.g., the communication network 110) is accessible from the access point. In case, the communication network 110 is inaccessible directly from the access point, an accessibility to the communication network 110 from another access point (e.g., the second access point 108) within a certain radius (e.g., the second predefined radius) of the initial access point may be determined. In case, the communication network 110 is determined to be accessible from the other access point (i.e., a one-hop access point), the initial access point (e.g., the first access point 104) and the one-hop access point (e.g., the second access point 108) may be connected (e.g., through a mesh network) with each other to provide an end-to-end connectivity with the communication network 110 to the electronic device 102. Thus, the connectivity range of the electronic device 102 to the communication network 110 may be extended based on connectivity of the directly connected access point with a one-hop access point connected to the communication network 110. The connectivity range may be extended further based on more than one intermediate access points with a certain access point (an n-hop access point) being connected to the communication network 110. Also, based on the distance of the electronic device 102 with nearby access points, a handover between access points in the mesh network may take place. Such handovers may maintain a signal strength of the connection of the electronic device 102 to the communication network 110, while the mobility of the electronic device 102 may also be maintained.

Figure 4A:
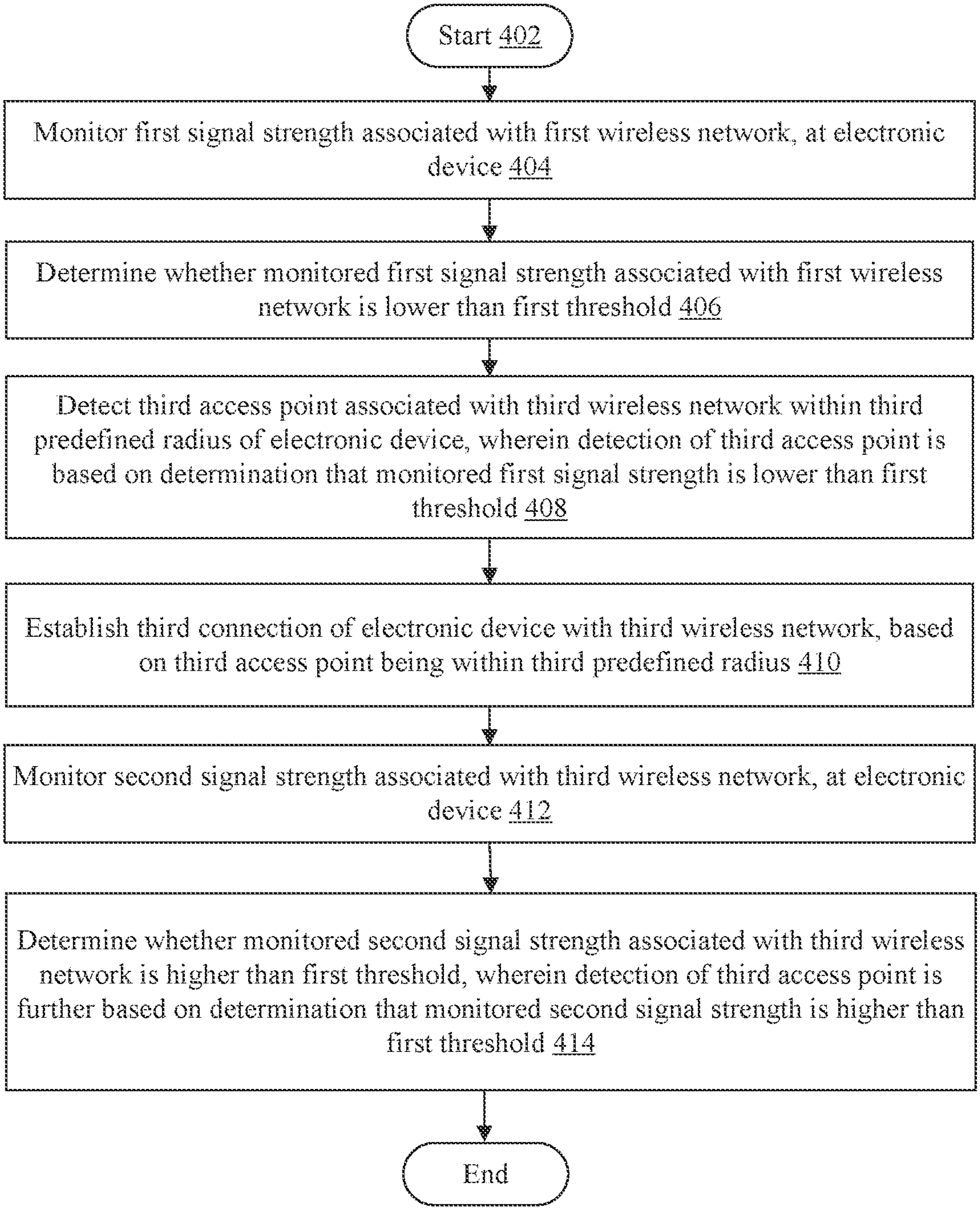
FIG. 4A is a flowchart that illustrates operations of an exemplary method for third access point detection, in accordance with an embodiment of the disclosure.

FIG. 4A is a flowchart that illustrates operations of an exemplary method for third access point detection, in accordance with an embodiment of the disclosure. FIG. 4A is described in conjunction with elements from FIG. 1, FIG. 2, FIG. 3A, and FIG. 3B. With reference to FIG. 4A, there is shown an exemplary flowchart 400A. The flowchart 400A may include operations from 402 to 414 and may be implemented by the electronic device 102 of FIG. 1 or by the processor 208 of FIG. 2. The flowchart 400A may start at 402 and proceed to 404.

At 404, the first signal strength associated with the first wireless network may be monitored at the electronic device. The processor 208 may be configured to monitor the first signal strength associated with first wireless network 104A, at the electronic device 102. The first signal strength may correspond to quality of the RF/EM signals received at the electronic device 102, wherein the electronic device 102 may be located at a certain distance from the first access point 104 and within a coverage range of the first wireless network 104A. Further, the first signal strength may be expressed in dB-microvolts per meter (dBμV/m) or in decibels. For example, the electronic device 102 may receive a signal transmitted from the first access point 104, a signal to interference plus noise ratio (SINR) considering a received signal strength index (RSSI), and interference from another access points (such as, the second access point 108 or others). The interference from another access points may be received as the first access point 104 may correspond to a mesh network of the set of interconnected access points. Details related to the first signal strength monitoring are described further, for example, in FIG. 3A (at 314).

At 406, it may be determined whether the monitored first signal strength associated with the first wireless network is less than the first predefined threshold. The processor 208 may be configured to determine whether the monitored first signal strength associated with the first wireless network is less than the first predefined threshold. The processor 208 may be configured to compare the first signal strength with the first threshold. The comparison may be performed to determine whether the monitored first signal strength associated with the first wireless network 104A is lower than the first threshold. The first threshold may refer to a predefined minimum signal level that may be required for the access points or the electronic device 102 to maintain a stability in connection. Further, when the first signal strength falls below the first threshold, the connection may become unstable or drop altogether. The first threshold may be adjusted by the user 112 in some access points to optimize the quality of the connection. Details related to the determination whether the monitored first signal strength is lower than the first threshold are described further, for example, in FIG. 3A (at 316).

At 408, the third access point within the third predefined radius of the electronic device may be detected, wherein the detection of third access point may be based on the determination that the monitored first signal strength is lower than the first threshold. The processor 208 may be configured to detect the third access point associated with the third wireless network within the third predefined radius of the electronic device 102. The detection of the third access point may be based on the determination that the monitored first signal strength associated with the first access point 104 may be lower than the first threshold. The third predefined radius may be a radius associated with a connectivity area of the third access point. The third access point may be detected if the electronic device 102 lies within the third predefined radius, inside the connectivity area of the third access point. The third access point may correspond to the mesh network of the set of interconnected access points. The third access point may be an intermediate device that may provide an accessibility of the external network associated with the mesh network. Furthermore, the third access point may establish a wireless network connection with the electronic device 102 associated with the user 112. Examples of the third access point may include, but is not limited to, a Wi-Fi router, a mobile hotspot, a Bluetooth device, a ZigBee device, and a base station. Details related to the detection of the third access point are described further, for example, in FIG. 3A (at 318).

At 410, the third connection of the electronic device with the third wireless network may be established, based on the third access point being within the third predefined radius. The processor 208 may be configured to establish the third connection of the electronic device 102 with the third wireless network based on the third access point being within the third predefined radius. The third connection may be a wired or a wireless communication of the electronic device 102 with the third access point. The third connection may include, but is not limited to, a daisy-chain connection, a Bluetooth network connection, a Wi-Fi network connection, a cellular network connection, a sensor network connection, a near-field connection, a radio-frequency (RF) network connection, a satellite network connection, or other suitable network connection. Details related to the establishment of the third connection are described further, for example, in FIG. 3A (at 320).

At 412, the second signal strength associated with third wireless network may be monitored, at the electronic device. The processor 208 may be configured to monitor the second signal strength associated with the third wireless network, at the electronic device 102. The second signal strength may correspond to a quality of the RF/EM signals received at the electronic device 102, wherein the electronic device 102 may be located at a certain distance from the third access point and within a coverage range of the third wireless network. Further, the second signal strength may be expressed in dB-microvolts per meter (dBμV/m) or in decibels. For example, the electronic device 102 may receive a signal transmitted from the third access point, a signal to interference plus noise ratio (SINR) considering a received signal strength index (RSSI), and interference from another access points (such as, the second access point 108 or others). The interference from another access point may be received as the third access point may correspond to a mesh network of the set of interconnected access points. Details related to the monitoring of the second signal strength are described further, for example, in FIG. 3B (at 322).

At 414, it may be determined whether the monitored second signal strength associated with the third wireless network is higher than the first threshold, wherein the detection of the third access point may be based on the determination that the monitored second signal strength is higher than the first threshold. The processor 208 may be configured to determine whether the monitored second signal strength associated with the third wireless network is higher than the first threshold. The processor 208 may be configured to compare the second signal strength with the first threshold. The comparison may be to determine whether the monitored second signal strength associated with the third wireless network is higher than the first threshold. The first threshold may refer to a predefined minimum signal level that is required for the access points or the electronic device 102 to maintain a stability in connection. Further, in case, the second signal strength falls below the first threshold, the connection may become unstable or drop altogether. Also, when the second signal strength is higher than the first threshold, the connection may become stronger and provide better quality connectivity. The first threshold may be adjusted by the user 112 in some access points to optimize the quality of the connection. Further, the detection of the third access point may be based on the determination that the monitored second signal strength is higher than the first threshold. Upon determination that the second signal strength is higher than the first threshold, the electronic device 102 may establish a third connection with the third access point. Herein, the third access point may be associated with the third wireless network within the third predefined radius of the electronic device 102. Control may pass to end.

Although the flowchart 400A is illustrated as discrete operations, such as, 404, 406, 408, 410, 412, and 414 the disclosure is not so limited. Accordingly, in certain embodiments, such discrete operations may be further divided into additional operations, combined into fewer operations, or eliminated, depending on the implementation without detracting from the essence of the disclosed embodiments.

Figure 4B:
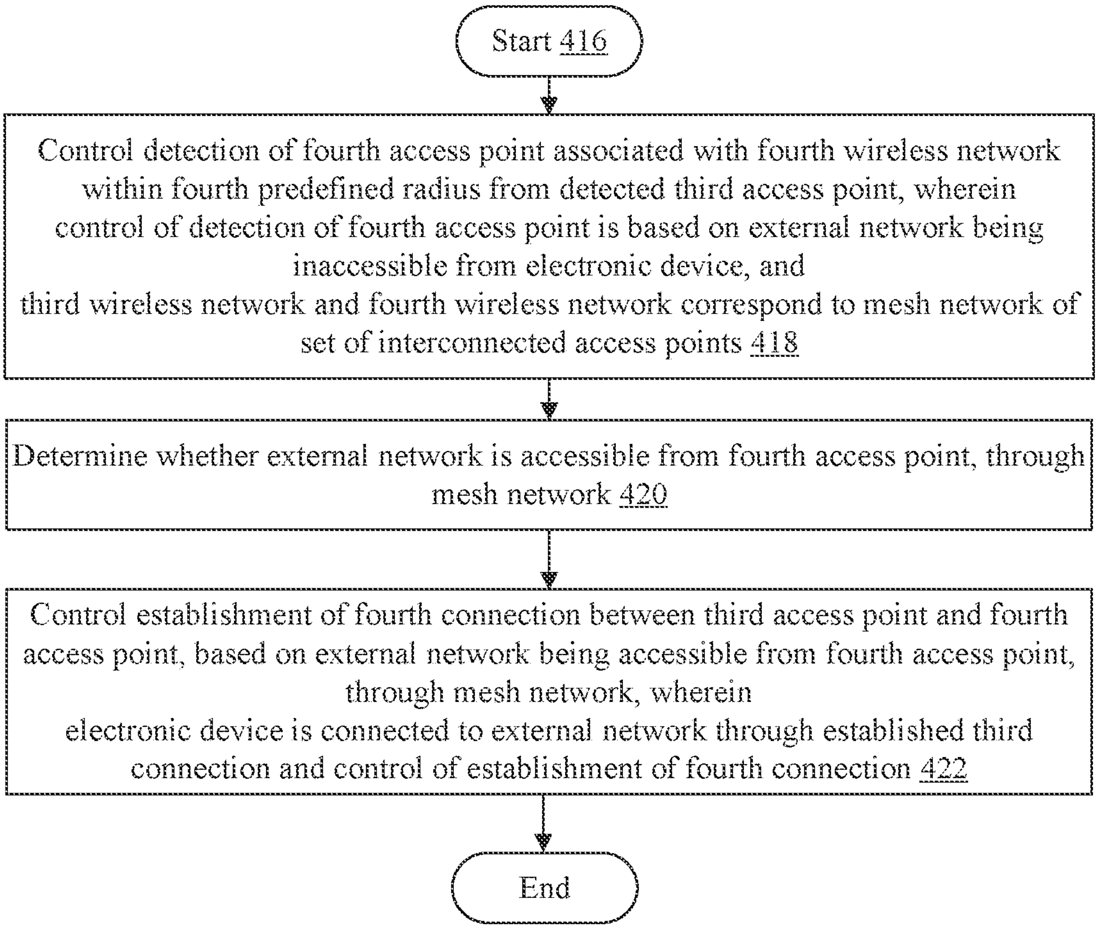
FIG. 4B is a flowchart that illustrates operations of an exemplary method for fourth access point detection, in accordance with an embodiment of the disclosure.

FIG. 4B is a flowchart that illustrates operations of an exemplary method for fourth access point detection, in accordance with an embodiment of the disclosure. FIG. 4B is described in conjunction with elements from FIG. 1, FIG. 2, FIG. 3A, FIG. 3B, and FIG. 4A. With reference to FIG. 4B, there is shown an exemplary flowchart 400B. The flowchart 400B may include operations from 416 to 422 and may be implemented by the electronic device 102 of FIG. 1 or by the processor 208 of FIG. 2. The flowchart 400B may start at 416 and proceed to 418.

At 418, control the detection of the fourth access point associated with fourth wireless network within fourth predefined radius from detected third access point. The control of the detection of the fourth access point may be based on the external network being inaccessible from the electronic device, and the third wireless network and the fourth wireless network corresponding to the mesh network of a set of interconnected access points. The processor 208 may be configured to control detection of the fourth access point associated with a fourth wireless network within a fourth predefined radius form the third access point. The control of the detection of the fourth access point may be based on the inaccessibility of the external network from the electronic device 102. Further, the third wireless network and the fourth wireless network may correspond to the mesh network of the set of interconnected access points. Further, the fourth predefined radius may be the radius associated with the connectivity area of the detected third access point. The fourth access point may be an intermediate device that may provide an accessibility of the external network associated with the mesh network. Furthermore, the fourth access point may establish a wireless network connection with the third access point. Examples of the fourth access point may include, but is not limited to, a Wi-Fi router, a mobile hotspot, a Bluetooth device, a ZigBee device, and a base station. Details related to the detection of the fourth access point are described further, for example, in FIG. 3B (at 326).

At 420, it may be determined whether the external network is accessible from the fourth access point, through the mesh network. The processor 208 may be configured to determine whether the external network is accessible from the fourth access point, through the mesh network. The mesh network may include the set of interconnected access points. The external network accessibility may be determined based on the connectivity of the fourth access point with the external network. The external network accessibility from the fourth access point may be based on a transmission power, locations, and a physical structure of a building, premises, or campus on which the fourth access point may be located. In an example, the external network may be, but is not limited to, an internet, a Local Area Network (LAN), a Metropolitan Area Network (MAN), a Wide Area Network (WAN), a public switched telephone network (PSTN), a mobile telephone switching office (MTSO), and a satellite networks. In an embodiment, the external network may be the Internet that may be accessible through the server 106. Also, the fourth access point may be a fourth Wi-Fi router. For example, the fourth Wi-Fi router may determine the accessibility of the internet through the mesh network. Details related to the determination of the accessibility of the external network from the fourth access point are described further, for example, in FIG. 3B (at 328).

At 422, control the establishment of the fourth connection between the third access point and the fourth access point based on the external network being accessible from the fourth access point, through the mesh network, wherein the electronic device may be connected to the external network through the established third connection and the control of establishment of the fourth connection. The processor 208 may be configured to control the establishment of the fourth connection between the third access point and the fourth access point, based on the external network being accessible from the fourth access point, through the mesh network. The electronic device 102 may be connected to the external network through the established third connection and the control of establishment of the fourth connection. Details related to the control of the establishment of the fourth connection are further described, for example, in FIG. 3B (at 330). Control may pass to end.

Although the flowchart 400B is illustrated as discrete operations, such as, 404, 418, 420, and 422 the disclosure is not so limited. Accordingly, in certain embodiments, such discrete operations may be further divided into additional operations, combined into fewer operations, or eliminated, depending on the implementation without detracting from the essence of the disclosed embodiments.

Figure 4C:
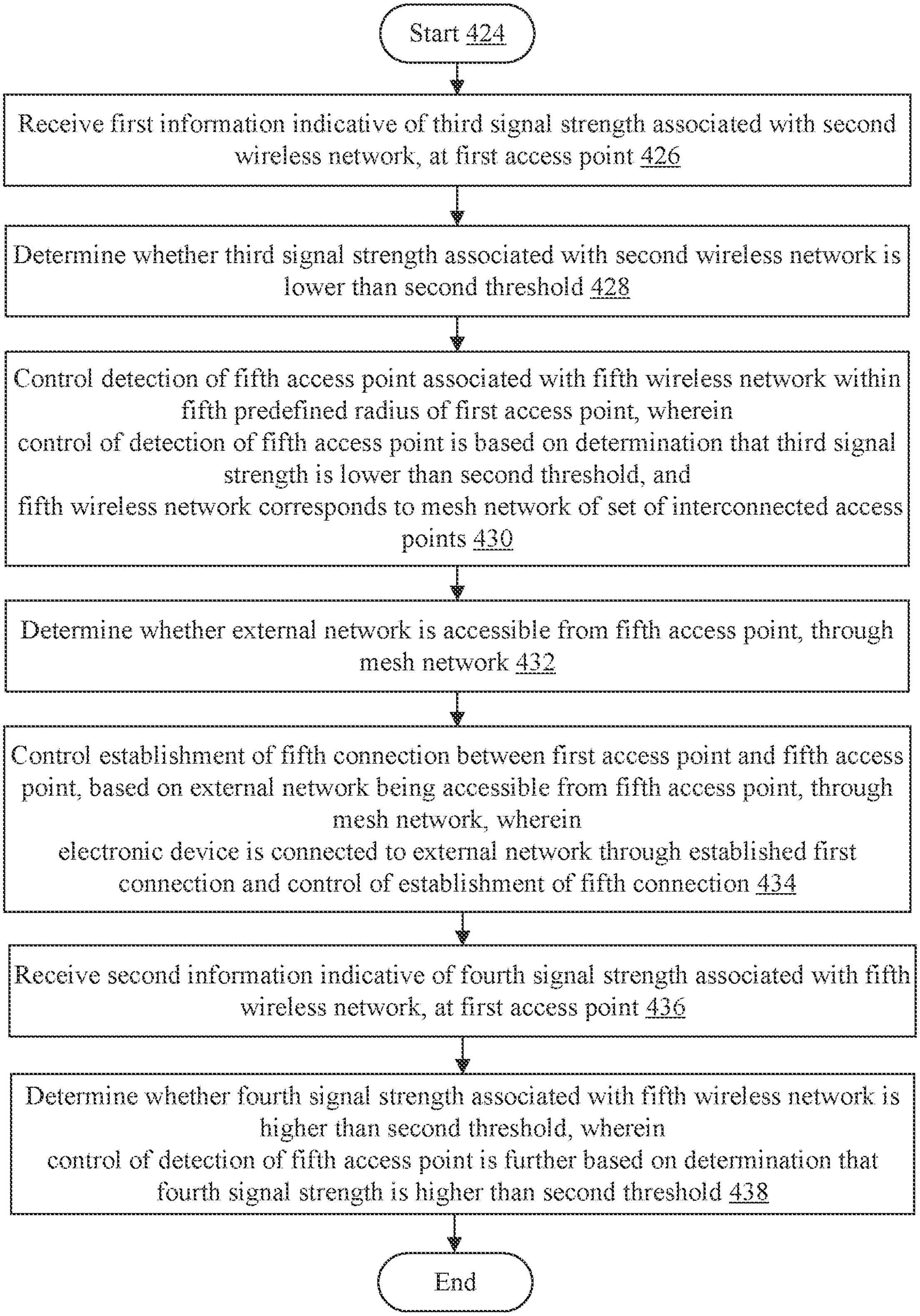
FIG. 4C is a flowchart that illustrates operations of an exemplary method for fifth access point detection, in accordance with an embodiment of the disclosure.

FIG. 4C is a flowchart that illustrates operations of an exemplary method for fifth access point detection, in accordance with an embodiment of the disclosure. FIG. 4C is described in conjunction with elements from FIG. 1, FIG. 2, FIG. 3A, FIG. 3B, FIG. 4A, and FIG. 4B. With reference to FIG. 4C, there is shown an exemplary flowchart 400C. The flowchart 400C may include operations from 424 to 438 and may be implemented by the electronic device 102 of FIG. 1 or by the processor 208 of FIG. 2. The flowchart 400C may start at 424 and proceed to 426.

At 426, the first information indicative of the third signal strength associated with the second wireless network, at the first access point may be received. The processor 208 may be configured to receive the first information indicative of the third signal strength associated with the second wireless network 108A, at the first access point 104. The first information may be received from the first access point 104. The first information may be indicative of the third signal strength corresponding to information of a quality of the RF/EM signals received at the second access point 108, wherein the second access point 108 may be located at a certain distance from the first access point 104 and within a coverage range of the first wireless network 104A. Further, the third signal strength may be expressed in dB-microvolts per meter (dBμV/m) or in decibels. For example, the first access point 104 may receive a signal transmitted from the second access point 108, a signal to interference plus noise ratio (SINR) considering a received signal strength index (RSSI) and interference from another access points (such as, the second access point 108 or others). The interference from another access point may be received as the second access point 108 may correspond to a mesh network of the set of interconnected access points. Details related to the reception of the first information are described further, for example, in FIG. 3B (at 332).

At 428, it may be determined whether the third signal strength associated with second wireless network is lower than the second threshold. The processor 208 may be configured to determine whether the third signal strength associated with second wireless network 108A is lower than the second threshold. The processor 208 may compare the third signal strength with the second threshold, wherein the comparison may be performed to determine whether the third signal strength associated with the second wireless network is lower than the second threshold. The second threshold may refer to a predefined minimum signal level that is required for the access points or the electronic device 102 to maintain stability in connection. Further, when the third signal strength falls below the second threshold, a connection may become unstable or drop altogether. Also, when the third signal strength is higher than the second threshold, the connection may become stronger and provide better quality connectivity. The second threshold may be adjusted by the user 112 in some access points to optimize the quality of the connection. Details related to the second threshold comparison are described further, for example, in FIG. 3B (at 334).

At 430, control the detection of the fifth access point associated with the fifth wireless network within the fifth predefined radius of the first access point. The control of the detection of fifth access point may be based on the determination that the third signal strength is lower than the second threshold, and the fifth wireless network corresponds to a mesh network of a set of interconnected access points. The processor 208 may be configured to control detection of the fifth access point associated with a fifth wireless network within a fifth predefined radius from the first access point 104. The fifth access point may be an intermediate device that may be configured to provide accessibility of the external network associated with the mesh network to the electronic device 102. The fifth access point may establish a wireless network connection (such as, the fifth connection) with the first access point 104 associated with the electronic device 102. The accessibility to the external network may be provided either directly or through one or more other access points, by the fifth access point. Details related to the detection of the fifth access point are described further, for example, in FIG. 3B (at 336).

At 432, it may be determined whether the external network is accessible from the fifth access point, through the mesh network. The processor 208 may be configured to determine whether the external network is accessible from the fifth access point, through the mesh network. The mesh network may include the set of interconnected access points. The external network accessibility may be determined based on the connectivity of the fifth access point with the external network. The external network accessibility from the fifth access point may be based on a transmission power, locations, and a physical structure of the building, premises, or campus on which the fifth access point may be located. In an example, the external network may be, but is not limited to, an internet, a Local Area Network (LAN), a Metropolitan Area Network (MAN), a Wide Area Network (WAN), a public switched telephone network (PSTN), a mobile telephone switching office (MTSO), and a satellite networks. In an embodiment, the external network may be the Internet that may be accessible through the server 106. Also, the fifth access point may be a fifth Wi-Fi router. For example, the fifth Wi-Fi router may determine the accessibility of the internet through the mesh network. Details related to the detection of the accessibility of the external network from the fifth access point are described further, for example, in FIG. 3B (at 338).

At 434, control the establishment of the fifth connection between the first access point 104 and the fifth access point based on the external network being accessible from the fifth access point, through the mesh network, wherein the electronic device 102 may be connected to the external network through the established first connection and the control of establishment of the fifth access point. The processor 208 may be configured to control the establishment of the fifth connection between the first access point 104 and the fifth access point, based on the external network accessibility from the fifth access point. Further, when the fifth access point may be able to access the external network, the fifth access point may establish the fifth connection with the first access point 104 to provide the electronic device 102 with connectivity to the external network. Furthermore, the electronic device 102 may connect to the external network through the established first connection and the established fifth connection. Herein, the established first connection may be between the electronic device 102 and the first access point 104. Furthermore, the fifth connection may include, but is not limited to, a daisy-chain connection, a Bluetooth network connection, a Wi-Fi network connection, a cellular network connection, a sensor network connection, a radio-frequency (RF) network connection, a satellite network connection, or other suitable network connection. Details related to the establishment of the fifth connection are described further, for example, in FIG. 3B (at 340).

At 436, the second information indicative of a fourth signal strength associated with the fifth wireless network, at the first access point 104, may be received. The processor 208 may be configured to receive the second information indicative of the fourth signal strength associated with the fifth wireless network, at the first access point 104. The second information may be received from the first access point 104. The second information may be indicative of the fourth signal strength corresponding to information of a quality of the RF/EM signal received at the fifth access point, wherein the fifth access point may be located at a certain distance from the first access point 104 and within the first wireless network 104A. Further, the fourth signal strength may be expressed in dB-microvolts per meter (dBμV/m) or in decibels. For example, the first access point 104 may receive a signal transmitted from the fifth access point, a signal to interference plus noise ratio (SINR) considering a received signal strength index (RSSI) and interference from another access points (such as, the second access point 108 or others). The interference from another access point may be received as the fifth access point may correspond to a mesh network of the set of interconnected access points.

At 438, it may be determined whether the fourth signal strength associated with the fifth wireless network is higher than the second threshold. The control of detection of the fifth access point is further based on determination that the fourth signal strength is higher than the second threshold. The processor 208 may be configured to determine whether the fourth signal strength associated with the fifth wireless network is higher than the second threshold. The processor 208 may compare the fourth signal strength with the second threshold, wherein the comparison may be performed to determine whether the fourth signal strength associated with the fifth wireless network is higher than the second threshold. The second threshold may refer to a predefined minimum signal level that may be required for the access points or the electronic device 102 to maintain stability in connection. Further, when the fourth signal strength falls below the second threshold, a connection may become unstable or drop altogether. Also, when the fourth signal strength is higher than the second threshold, the connection may become stronger and provide better quality connectivity. The second threshold may be adjusted by the user 112 in some access points to optimize the quality of the connection. Further, based on determining that the fourth signal strength is higher than the second threshold, the electronic device 102 may detect the fifth access point to establish the fifth connection with the fifth access point. The fifth access point may be associated with the fifth wireless network within the fifth predefined radius of the electronic device 102. Control may pass to end.

Although the flowchart 400C is illustrated as discrete operations, such as, 426, 428, 430, 432, 434, 436 and 438 the disclosure is not so limited. Accordingly, in certain embodiments, such discrete operations may be further divided into additional operations, combined into fewer operations, or eliminated, depending on the implementation without detracting from the essence of the disclosed embodiments.

Figure 5:
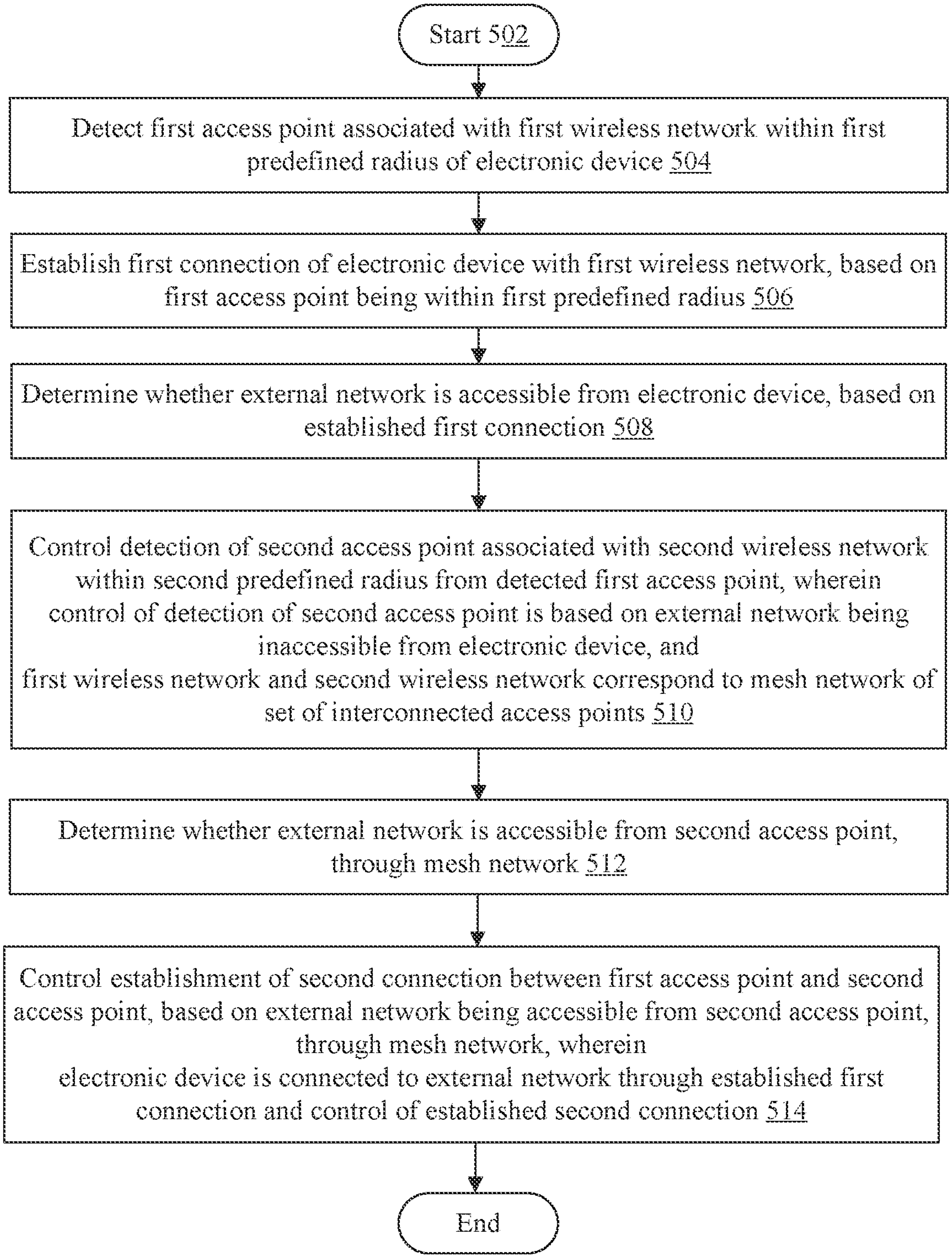
FIG. 5 is a flowchart that illustrates operations of an exemplary method for external network connectivity based on access point handover through mesh network, in accordance with an embodiment of the disclosure.

FIG. 5 is a flowchart that illustrates operations of an exemplary method for external network connectivity based on access point handover through mesh network, in accordance with an embodiment of the disclosure. FIG. 5 is described in conjunction with elements from FIG. 1, FIG. 2, FIG. 3A, FIG. 3B, FIG. 4A, FIG. 4B, and FIG. 4C. With reference to FIG. 5, there is shown a flowchart 500. The flowchart 500 may include operations from 502 to 514 and may be implemented by the electronic device 102 of FIG. 1 or by the processor 208 of FIG. 2. The flowchart 500 may start at 502 and proceed to 504.

At 504, the first access point 104 associated with the first wireless network 104A may be detected. The processor 208 may be configured to detect the first access point 104 associated with the first wireless network 104A. The first wireless network may be within the first predefined radius of the electronic device 102. Details related to the first access point are further described, for example, in FIG. 3A (at 302).

At 506, the first connection of the electronic device 102 may be established. The processor 208 may be configured to establish the first connection of the electronic device 102 with the first wireless network 104A, based on the first access point 104 being within the first predefined radius. Details related to the first connection are further described, for example, in FIG. 3A (at 304).

At 508, the accessibility of the external network from the first access point 104 may be determined. The processor 208 may be configured to determine whether the external network is accessible from the electronic device 102, based on the established first connection. Details related to the external network are further described, for example, in FIG. 3A (at 306).

At 510, a detection of the second access point 108 associated with the second wireless network 108A from the detected first access point 104 may be controlled. The processor 208 may be configured to control detection of the second access point 108 associated with the second wireless network 108A within the second predefined radius from the detected first access point 104. The control of the detection of the point may be based on the external network being inaccessible from the electronic device 102, and the first wireless network 104A and the second wireless network 108A may correspond to the mesh network of the set of interconnected access points. Details related to the second access point are further described, for example, in FIG. 3A (at 308) and details related to the mesh network are further described, for example, in FIG. 3A (at 310).

At 512, the accessibility of the external network from the second access point 108 may be determined. The processor 208 may be configured to determine whether the external network is accessible from the second access point 108, through the mesh network. Details related to the external network are further described, for example, in FIG. 3A (at 310).

At 514, the establishment of the second connection may be controlled. The processor 208 may be configured to control establishment of the second connection between the first access point 104 and second access point 108, based on the external network being accessible from the second access point 108, through the mesh network. The electronic device 102 may be connected to the external network through the established first connection and the control of the established second connection. Details related to the second connection are further described, for example, in FIG. 3A (at 312). Control may pass to end.

Although the flowchart 500 is illustrated as discrete operations, such as, 504, 506, 508, 510, 512 and 514 the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include detection of a first access point (e.g., the first access point 104) associated with a first wireless network (e.g., the first wireless network 104A) within a first predefined radius. The operations may further include establishment of a first connection of the electronic device 102 with the first wireless network 104A, based on the first access point 104 being within the first predefined radius. The operations may further include determination of whether an external network is accessible from the electronic device 102, based on the established first connection. The operations may further include control of detection of a second access point (e.g., the second access point 108) associated with a second wireless network (e.g., the second wireless network 108A) within a second predefined radius from the detected first access point 104, wherein the control of the detection of the second access point may be based on the external network being inaccessible from the electronic device 102, The first wireless network 104A and the second wireless network 108A may correspond to a mesh network of a set of interconnected access points. The operations may further include determination of whether the external network is accessible from the second access point 108, through the mesh network. The operations may further include control of establishment of a second connection between the first access point 104 and the second access point 108, based on the external network being accessible from the second access point 108, through the mesh network, where the electronic device 102 may be connected to the external network through the established first connection and the control of the established second connection.

Exemplary aspects of the disclosure may provide an electronic device (such as, the electronic device 102 of FIG. 1) that includes circuitry (such as, the processor 208). The processor 208 may be configured to detect a first access point (e.g., the first access point 104) associated with a first wireless network (e.g., the first wireless network 104A) within a first predefined radius. The processor 208 may be configured to establish a first connection of the electronic device 102 with the first wireless network 104A, based on the first access point 104 being within the first predefined radius. The processor 208 may be further configured to determine whether an external network is accessible from the electronic device 102, based on the established first connection. The processor 208 may be configured to control of detection of a second access point (e.g., the second access point 108) associated with a second wireless network (e.g., the second wireless network 108A) within a second predefined radius from the detected first access point 104, wherein the control of the detection of the second access point 108 may be based on the external network being inaccessible from the electronic device 102. The first wireless network 104A and the second wireless network 108A may correspond to a mesh network of a set of interconnected access points. The processor 208 may be configured to determine whether the external network is accessible from the second access point 108, through the mesh network. The processor 208 may be configured to control establishment of a second connection between the first access point 104 and the second access point 108, based on the external network being accessible from the second access point 108, through the mesh network, wherein the electronic device 102 may be connected to the external network through the established first connection and the control of the established second connection.

In an embodiment, the external network may be accessible directly from the second access point 108.

In an embodiment, the external network may be accessible through one or more access points of the mesh network, the one or more access points being other than the first access point 104 and the second access point 108.

In an embodiment, the number of the one or more other access points through which the external network is accessible may be less than a predefined hop value.

In an embodiment, the processor 208 may be further configured to monitor a first signal strength associated with the first wireless network 104A, at the electronic device 102. The processor 208 may be further configured to determine whether the monitored first signal strength associated with the first wireless network 104A is lower than a first threshold. The processor 208 may be further configured to detect a third access point associated with a third wireless network within a third predefined radius of the electronic device 102, wherein the detection of the third access point may be based on the determination that the monitored first signal strength is lower than the first threshold. The processor 208 may be further configured to establish a third connection of the electronic device 102 with the third wireless network, based on the third access point being within the third predefined radius.

In an embodiment, the processor 208 may be further configured to monitor a second signal strength associated with the third wireless network, at the electronic device 102. The processor 208 may be further configured to determine whether the monitored second signal strength associated with the third wireless network is higher than the first threshold. The detection of the third access point may be further based on the determination that the monitored second signal strength being higher than the first threshold.

In an embodiment, the third predefined radius may correspond to the first predefined radius.

In an embodiment, the processor 208 may be further configured to determine whether the external network is accessible from the electronic device 102, based on the established third connection.

In an embodiment, the processor 208 may be further configured to control detection of a fourth access point associated with a fourth wireless network within a fourth predefined radius from the detected third access point, wherein the control of the detection of the fourth access point may be based on the external network being inaccessible from the electronic device 102. The third wireless network and the fourth wireless network may correspond to the mesh network of the set of interconnected access points. The processor 208 may be further configured to determine whether the external network is accessible from the fourth access point, through the mesh network. The processor 208 may be further configured to control establishment of a fourth connection between the third access point and the fourth access point, based on the external network being accessible from the fourth access point, through the mesh network. The electronic device 102 may be connected to the external network through the established third connection and the control of the establishment of the fourth connection.

In an embodiment, the fourth predefined radius may correspond to the second predefined radius.

In an embodiment, the fourth wireless network may be different from the second wireless network 108A.

In an embodiment, the fourth access point may be different from the second access point 108.

In an embodiment, the fourth wireless network may correspond to the second wireless network 108A.

In an embodiment, the fourth access point may correspond to the second access point 108 associated with the second wireless network 108A.

In an embodiment, the processor 208 may be further configured to receive first information indicative of a third signal strength associated with the second wireless network 108A, at the first access point 104. The processor 208 may be further configured to determine whether the third signal strength associated with the second wireless network is lower than a second threshold. The processor 208 may be further configured to control detection of a fifth access point associated with a fifth wireless network within a fifth predefined radius of the first access point 104. The control of the detection of the fifth access point may be based on the determination that the third signal strength may be lower than the second threshold, and the fifth wireless network may correspond to the mesh network of the set of interconnected access points. The processor 208 may be further configured to determine whether the external network is accessible from the fifth access point, through the mesh network. The processor 208 may be further configured to control establishment of a fifth connection between the first access point 104 and the fifth access point, based on the external network being accessible from the fifth access point, through the mesh network. The electronic device 102 may be connected to the external network through the established first connection and the control of the establishment of the fifth connection.

In an embodiment, the processor 208 may be further configured to receive second information indicative of a fourth signal strength associated with the fifth wireless network, at the first access point 104. The processor 208 may be further configured to determine whether the fourth signal strength associated with the fifth wireless network is higher than the second threshold. The control of the detection of the fifth access point may be further based on the determination that the fourth signal strength is higher than the second threshold.

In an embodiment, the fifth predefined radius may correspond to the second predefined radius.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
circuitry configured to:
detect a first access point associated with a first wireless network within a first radius of the electronic device;
establish a first connection of the electronic device with the first wireless network, based on the first access point being within the first radius;
determine whether an external network is accessible from the electronic device through the first access point, based on a connectivity between the electronic device and the first access point and a connectivity between the first access point and the external network;
control detection of a second access point associated with a second wireless network within a second radius from the detected first access point, wherein
the control of the detection of the second access point is based on the external network being inaccessible from the electronic device through the first access point, and
the first wireless network and the second wireless network correspond to a mesh network of a set of interconnected access points;
determine whether the external network is accessible from the second access point, through the mesh network; and
control establishment of a second connection between the first access point and the second access point, based on the determination that the external network is accessible from the second access point, through the mesh network, wherein the electronic device is connected to the external network based on the established first connection and the control of the established second connection.

2. The electronic device according to claim 1, wherein the external network is accessible directly from the second access point.

3. The electronic device according to claim 1, wherein
the external network is accessible through at least one access point of the mesh network, and
the at least one access point excludes the first access point and the second access point.

4. The electronic device according to claim 3, wherein a number of the at least one access point is less than a specific hop value.

5. The electronic device according to claim 1, wherein the circuitry is further configured to:
monitor a first signal strength associated with the first wireless network, at the electronic device;

determine whether the monitored first signal strength associated with the first wireless network is lower than a threshold;

detect a third access point associated with a third wireless network within a third radius of the electronic device, wherein the detection of the third access point is based on the determination that the monitored first signal strength is lower than the threshold; and establish a third connection of the electronic device with the third wireless network, based on the third access point being within the third radius.

6. The electronic device according to claim 5, wherein the circuitry is further configured to:

monitor a second signal strength associated with the third wireless network, at the electronic device;

determine whether the monitored second signal strength associated with the third wireless network is higher than the threshold; and detect the third access point based on the determination that the monitored second signal strength is higher than the threshold.

7. The electronic device according to claim 5, wherein the third radius corresponds to the first radius.

8. The electronic device according to claim 5, wherein the circuitry is further configured to determine whether the external network is accessible from the electronic device, based on the established third connection.

9. The electronic device according to claim 8, wherein the circuitry is further configured to:

control detection of a fourth access point associated with a fourth wireless network within a fourth radius from the detected third access point, wherein the control of the detection of the fourth access point is based on the external network being inaccessible from the electronic device, and the third wireless network and the fourth wireless network correspond to the mesh network of the set of interconnected access points;

determine whether the external network is accessible from the fourth access point, through the mesh network; and control establishment of a fourth connection between the third access point and the fourth access point, based on the determination that the external network is accessible from the fourth access point, through the mesh network, wherein the electronic device is connected to the external network based on the established third connection and the control of the establishment of the fourth connection.

10. The electronic device according to claim 9, wherein the fourth radius corresponds to the second radius.

11. The electronic device according to claim 9, wherein the fourth wireless network is different from the second wireless network.

12. The electronic device according to claim 9, wherein the fourth access point is different from the second access point.

13. The electronic device according to claim 9, wherein the fourth wireless network corresponds to the second wireless network.

14. The electronic device according to claim 9, wherein the fourth access point corresponds to the second access point associated with the second wireless network.

15. The electronic device according to claim 1, wherein the circuitry is further configured to:

receive first information indicative of a third signal strength associated with the second wireless network, at the first access point;

determine whether the third signal strength associated with the second wireless network is lower than a threshold;

control detection of a fifth access point associated with a fifth wireless network within a fifth radius of the first access point, wherein the control of the detection of the fifth access point is based on the determination that the third signal strength is lower than the threshold, and the fifth wireless network corresponds to the mesh network of the set of interconnected access points;

determine whether the external network is accessible from the fifth access point, through the mesh network; and control establishment of a fifth connection between the first access point and the fifth access point, based on the determination that the external network is accessible from the fifth access point, through the mesh network, wherein the electronic device is connected to the external network based on the established first connection and the control of the establishment of the fifth connection.

16. The electronic device according to claim 15, wherein the circuitry is further configured to:

receive second information indicative of a fourth signal strength associated with the fifth wireless network, at the first access point;

determine whether the fourth signal strength associated with the fifth wireless network is higher than the threshold; and control the detection of the fifth access point based on the determination that the fourth signal strength is higher than the threshold.

17. The electronic device according to claim 15, wherein the fifth radius corresponds to the second radius.

18. A method, comprising:

in an electronic device:

detecting a first access point associated with a first wireless network within a first radius of the electronic device;

establishing a first connection of the electronic device with the first wireless network, based on the first access point being within the first radius;

determining whether an external network is accessible from the electronic device through the first access point, based on a connectivity between the electronic device and the first access point and a connectivity between the first access point and the external network;

controlling detection of a second access point associated with a second wireless network within a second radius from the detected first access point, wherein the control of the detection of the second access point is based on the determination that the external network is inaccessible from the electronic device through the first access point, and the first wireless network and the second wireless network correspond to a mesh network of a set of interconnected access points;

determining whether the external network is accessible from the second access point, through the mesh network; and controlling an establishment of a second connection between the first access point and the second access point, based on the determination that the external network is accessible from the second access point, through the mesh network, wherein the electronic device is connected to the external network based on the established first connection and the control of the established second connection.

19. The method according to claim 18, wherein the external network is accessible through at least one access point of the mesh network, the at least one access point excludes the first access point and the second access point, and a number of the at least one access point is less than a specific hop value.

20. A non-transitory computer-readable medium having stored thereon, computer-executable instructions that when executed by an electronic device, causes the electronic device to execute operations, the operations comprising:

detecting a first access point associated with a first wireless network within a first radius of the electronic device;

establishing a first connection of the electronic device with the first wireless network, based on the first access point being within the first radius;

determining whether an external network is accessible from the electronic device through the first access point, based on a connectivity between the electronic device and the first access point and a connectivity between the first access point and the external network;

controlling detection of a second access point associated with a second wireless network within a second radius from the detected first access point, wherein the control of the detection of the second access point is based on the determination that the external network is inaccessible from the electronic device through the first access point, and the first wireless network and the second wireless network correspond to a mesh network of a set of interconnected access points;

determining whether the external network is accessible from the second access point, through the mesh network; and controlling an establishment of a second connection between the first access point and the second access point, based on the determination that the external network is accessible from the second access point, through the mesh network, wherein the electronic device is connected to the external network based on the established first connection and the control of the established second connection.

* * * * *